US008892112B2

(12) United States Patent
Meredith et al.

(10) Patent No.: US 8,892,112 B2
(45) Date of Patent: *Nov. 18, 2014

(54) SELECTION OF A RADIO ACCESS BEARER RESOURCE BASED ON RADIO ACCESS BEARER RESOURCE HISTORICAL INFORMATION

(75) Inventors: Sheldon Meredith, Marietta, GA (US); Mark Austin, Roswell, GA (US); Mario Kosseifi, Roswell, GA (US)

(73) Assignee: AT&T Mobility II LLC, Atlanta, GA (US)

(*) Notice: Subject to any disclaimer, the term of this patent is extended or adjusted under 35 U.S.C. 154(b) by 29 days.

This patent is subject to a terminal disclaimer.

(21) Appl. No.: 13/188,295

(22) Filed: Jul. 21, 2011

(65) Prior Publication Data
US 2013/0023281 A1    Jan. 24, 2013

(51) Int. Cl.
*H04W 72/00* (2009.01)
*H04W 36/24* (2009.01)
*H04W 36/32* (2009.01)

(52) U.S. Cl.
CPC ............ *H04W 36/245* (2013.01); *H04W 36/32* (2013.01)
USPC ...................... 455/452.2; 455/450; 455/456.2; 455/453; 455/436; 370/329; 370/330

(58) Field of Classification Search
USPC ........... 455/456.1, 67.11, 555, 450, 436, 453, 455/452.2; 370/316, 329, 330
See application file for complete search history.

(56) References Cited

U.S. PATENT DOCUMENTS

| 5,515,062 A | 5/1996 | Maine et al. |
| 5,724,660 A | 3/1998 | Kauser et al. |
| 5,732,354 A | 3/1998 | MacDonald |
| 5,732,383 A | 3/1998 | Foladare et al. |

(Continued)

FOREIGN PATENT DOCUMENTS

| EP | 0856746 A2 | 8/1998 |
| JP | 2004069609 | 3/2004 |
| JP | 2007328050 A | 12/2007 |
| WO | 2006031035 A1 | 3/2006 |

OTHER PUBLICATIONS

OA dated Apr. 13, 2012 for U.S. Appl. No. 12/416,853, 36 pages.

(Continued)

*Primary Examiner* — Christopher M Brandt
*Assistant Examiner* — Joseph Dean, Jr.
(74) *Attorney, Agent, or Firm* — Amin, Turocy & Watson, LLP

(57) ABSTRACT

The disclosed subject matter provides for selecting a radio access bearer resource based on historical data related to the radio access bearer resource. Location information can be employed to determine a radio access bearer resource. Historical information related to the radio access bearer resource can then be employed to determine the suitability of the radio access bearer resource. A set of radio access bearer resources can be ordered or ranked to allow selection of a suitable radio access bearer resource from the set. Incorporation of historical information can provide for additional metrics in the selection of a radio access bearer resource over simple contemporaneous radio access bearer resource information. In some embodiments timed fingerprint location (TFL) information can be employed to determine a location.

20 Claims, 10 Drawing Sheets

(56) References Cited

U.S. PATENT DOCUMENTS

| | | |
|---|---|---|
| 5,844,521 A | 12/1998 | Stephens et al. |
| 5,982,324 A | 11/1999 | Watters et al. |
| 6,018,312 A | 1/2000 | Haworth et al. |
| 6,026,301 A | 2/2000 | Satarasinghe |
| 6,108,532 A | 8/2000 | Matsuda et al. |
| 6,108,556 A | 8/2000 | Ito |
| 6,148,219 A | 11/2000 | Engelbrecht et al. |
| 6,230,018 B1 | 5/2001 | Watters et al. |
| 6,256,577 B1 | 7/2001 | Graunke |
| 6,263,190 B1 | 7/2001 | Mamori et al. |
| 6,298,233 B1 | 10/2001 | Souissi et al. |
| 6,307,503 B1 | 10/2001 | Liu et al. |
| 6,311,078 B1 | 10/2001 | Hardouin et al. |
| 6,317,686 B1 | 11/2001 | Ran |
| 6,330,459 B1 | 12/2001 | Crichton et al. |
| 6,351,235 B1 | 2/2002 | Stilp |
| 6,353,778 B1 | 3/2002 | Brown et al. |
| 6,397,074 B1 | 5/2002 | Pihl et al. |
| 6,407,703 B1 | 6/2002 | Minter et al. |
| 6,429,815 B1 | 8/2002 | Soliman |
| 6,434,396 B1 | 8/2002 | Rune |
| 6,453,168 B1 | 9/2002 | McCrady et al. |
| 6,515,623 B2 | 2/2003 | Johnson |
| 6,522,296 B2 | 2/2003 | Holt |
| 6,526,335 B1 | 2/2003 | Treyz et al. |
| 6,560,532 B2 | 5/2003 | Cayford |
| 6,560,567 B1 | 5/2003 | Yechuri et al. |
| 6,594,576 B2 | 7/2003 | Fan et al. |
| 6,604,083 B1 | 8/2003 | Bailey et al. |
| 6,668,226 B2 | 12/2003 | Sutanto et al. |
| 6,690,292 B1 | 2/2004 | Meadows et al. |
| 6,744,383 B1 | 6/2004 | Alfred et al. |
| 6,744,740 B2 | 6/2004 | Chen |
| 6,801,782 B2 | 10/2004 | McCrady et al. |
| 6,801,855 B1 | 10/2004 | Walters et al. |
| 6,816,782 B1 | 11/2004 | Walters et al. |
| 6,892,054 B2 | 5/2005 | Belcher et al. |
| 6,933,100 B2 | 8/2005 | Igawa et al. |
| 6,933,860 B1 | 8/2005 | Gehman et al. |
| 7,065,349 B2 | 6/2006 | Nath et al. |
| 7,098,805 B2 | 8/2006 | Meadows et al. |
| 7,113,793 B2 | 9/2006 | Veerasamy et al. |
| 7,149,534 B2 | 12/2006 | Bloebaum et al. |
| 7,181,218 B2 * | 2/2007 | Ovesjo et al. ............... 455/436 |
| 7,277,049 B2 | 10/2007 | Korneluk et al. |
| 7,289,039 B2 | 10/2007 | Kato et al. |
| 7,346,359 B2 | 3/2008 | Damarla et al. |
| 7,359,719 B1 | 4/2008 | Duffett-Smith et al. |
| 7,366,492 B1 | 4/2008 | Ganesh |
| 7,375,649 B2 | 5/2008 | Gueziec |
| 7,432,829 B2 | 10/2008 | Poltorak |
| 7,436,794 B2 * | 10/2008 | Takahashi et al. ............ 370/318 |
| 7,508,321 B2 | 3/2009 | Gueziec |
| 7,664,492 B1 | 2/2010 | Lee et al. |
| 7,696,922 B2 | 4/2010 | Nicholson et al. |
| 7,697,917 B2 | 4/2010 | Camp et al. |
| 7,706,964 B2 | 4/2010 | Horvitz et al. |
| 7,744,740 B2 | 6/2010 | Diehl |
| 7,747,258 B2 | 6/2010 | Farmer et al. |
| 7,761,225 B2 | 7/2010 | Vaughn |
| 7,831,380 B2 | 11/2010 | Chapman et al. |
| 7,848,880 B2 | 12/2010 | Cheung |
| 7,890,299 B2 | 2/2011 | Fok et al. |
| 7,917,156 B2 | 3/2011 | Sheynblat et al. |
| 7,945,271 B1 | 5/2011 | Barnes et al. |
| 7,958,001 B2 | 6/2011 | Abbadessa et al. |
| 7,962,162 B2 | 6/2011 | McNair |
| 7,962,280 B2 | 6/2011 | Kindo et al. |
| 7,994,981 B1 | 8/2011 | Farrokhi et al. |
| 7,996,020 B1 | 8/2011 | Chhabra |
| 8,000,726 B2 | 8/2011 | Altman et al. |
| 8,005,050 B2 | 8/2011 | Scheinert et al. |
| 8,010,164 B1 | 8/2011 | Sennett et al. |
| 8,036,822 B2 | 10/2011 | Ho et al. |
| 8,054,802 B2 | 11/2011 | Burgess et al. |
| 8,121,604 B1 | 2/2012 | Schwinghammer |
| 8,140,079 B2 * | 3/2012 | Olson ............................ 455/440 |
| 8,193,984 B2 | 6/2012 | Ward et al. |
| 8,194,589 B2 | 6/2012 | Wynn et al. |
| 8,195,175 B2 * | 6/2012 | Govindan et al. ............. 455/450 |
| 8,224,349 B2 | 7/2012 | Meredith et al. |
| 8,253,559 B2 | 8/2012 | Howard et al. |
| 8,254,959 B2 | 8/2012 | Fix et al. |
| 8,264,956 B2 | 9/2012 | Ramankutty et al. |
| 8,270,933 B2 | 9/2012 | Riemer et al. |
| 8,280,438 B2 | 10/2012 | Barbera et al. |
| 8,295,854 B2 | 10/2012 | Osann et al. |
| 8,307,030 B1 | 11/2012 | Hu |
| 8,355,364 B1 | 1/2013 | Vargantwar et al. |
| 8,355,865 B2 | 1/2013 | Wagner et al. |
| 8,417,264 B1 | 4/2013 | Whitney et al. |
| 8,666,388 B2 | 3/2014 | Catovic et al. |
| 8,666,390 B2 | 3/2014 | Meredith et al. |
| 2001/0047242 A1 | 11/2001 | Ohta |
| 2002/0059266 A1 | 5/2002 | I'anson et al. |
| 2002/0069312 A1 | 6/2002 | Jones |
| 2002/0077116 A1 | 6/2002 | Havinis et al. |
| 2002/0172223 A1 | 11/2002 | Stilp et al. |
| 2003/0092448 A1 | 5/2003 | Forstrom et al. |
| 2003/0097330 A1 | 5/2003 | Hillmer et al. |
| 2003/0115260 A1 | 6/2003 | Edge |
| 2003/0158924 A1 | 8/2003 | DeLegge |
| 2003/0222819 A1 | 12/2003 | Karr et al. |
| 2003/0225508 A9 | 12/2003 | Petzld et al. |
| 2004/0067759 A1 | 4/2004 | Spirito et al. |
| 2004/0082338 A1 * | 4/2004 | Norrgard et al. ............ 455/452.2 |
| 2004/0127191 A1 | 7/2004 | Matsunaga |
| 2004/0131036 A1 | 7/2004 | Walsh |
| 2004/0155814 A1 | 8/2004 | Bascobert |
| 2004/0172190 A1 | 9/2004 | Tsunehara et al. |
| 2004/0219930 A1 | 11/2004 | Lin |
| 2004/0224698 A1 * | 11/2004 | Yi et al. ........................ 455/450 |
| 2005/0007993 A1 | 1/2005 | Chambers et al. |
| 2005/0039056 A1 | 2/2005 | Bagga et al. |
| 2005/0053099 A1 | 3/2005 | Spear et al. |
| 2005/0136911 A1 | 6/2005 | Csapo et al. |
| 2005/0239410 A1 | 10/2005 | Rochester |
| 2005/0272445 A1 | 12/2005 | Zellner et al. |
| 2005/0276385 A1 | 12/2005 | McCormick et al. |
| 2006/0030333 A1 | 2/2006 | Ward et al. |
| 2006/0046744 A1 | 3/2006 | Dublish et al. |
| 2006/0075131 A1 | 4/2006 | Douglas et al. |
| 2006/0089153 A1 | 4/2006 | Sheynblat |
| 2006/0240839 A1 | 10/2006 | Chen et al. |
| 2006/0267841 A1 | 11/2006 | Lee et al. |
| 2006/0270419 A1 | 11/2006 | Crowley et al. |
| 2006/0282660 A1 | 12/2006 | Varghese et al. |
| 2007/0001873 A1 | 1/2007 | Ishikawa et al. |
| 2007/0060130 A1 | 3/2007 | Gogic et al. |
| 2007/0176749 A1 | 8/2007 | Boyd |
| 2007/0213074 A1 | 9/2007 | Fitch et al. |
| 2007/0217375 A1 | 9/2007 | Zampiello et al. |
| 2007/0217379 A1 | 9/2007 | Fujiwara et al. |
| 2007/0293157 A1 | 12/2007 | Haartsen et al. |
| 2007/0298807 A1 | 12/2007 | Yarkosky |
| 2008/0004789 A1 | 1/2008 | Horvitz et al. |
| 2008/0010365 A1 | 1/2008 | Schneider |
| 2008/0039114 A1 | 2/2008 | Phatak et al. |
| 2008/0070593 A1 | 3/2008 | Altman et al. |
| 2008/0071466 A1 | 3/2008 | Downs et al. |
| 2008/0076450 A1 | 3/2008 | Nanda et al. |
| 2008/0096566 A1 | 4/2008 | Brunner et al. |
| 2008/0133730 A1 | 6/2008 | Park et al. |
| 2008/0186234 A1 | 8/2008 | Alles et al. |
| 2008/0192682 A1 | 8/2008 | Matsumoto et al. |
| 2008/0274750 A1 | 11/2008 | Carlson et al. |
| 2008/0299995 A1 | 12/2008 | Spain |
| 2008/0305832 A1 | 12/2008 | Greenberg |
| 2008/0311923 A1 * | 12/2008 | Petrovic et al. ............... 455/450 |
| 2009/0024546 A1 | 1/2009 | Ficcaglia et al. |
| 2009/0052330 A1 | 1/2009 | Matsunaga et al. |
| 2009/0079622 A1 | 3/2009 | Seshadri et al. |

(56) References Cited

U.S. PATENT DOCUMENTS

| | | | |
|---|---|---|---|
| 2009/0104917 A1 | 4/2009 | Ben Rached et al. | |
| 2009/0117907 A1* | 5/2009 | Wigren | 455/440 |
| 2009/0131073 A1 | 5/2009 | Carlson et al. | |
| 2009/0181695 A1* | 7/2009 | Wirola et al. | 455/456.1 |
| 2009/0260055 A1 | 10/2009 | Parmar | |
| 2009/0280828 A1 | 11/2009 | Wang et al. | |
| 2009/0286510 A1 | 11/2009 | Huber et al. | |
| 2009/0287922 A1 | 11/2009 | Herwono et al. | |
| 2009/0310501 A1 | 12/2009 | Catovic et al. | |
| 2009/0327134 A1 | 12/2009 | Carlson et al. | |
| 2010/0020776 A1 | 1/2010 | Youssef et al. | |
| 2010/0054237 A1 | 3/2010 | Han et al. | |
| 2010/0058442 A1 | 3/2010 | Costa et al. | |
| 2010/0081389 A1 | 4/2010 | Lawrow | |
| 2010/0100732 A1 | 4/2010 | Hatakeyama et al. | |
| 2010/0113035 A1 | 5/2010 | Eskicioglu et al. | |
| 2010/0120447 A1 | 5/2010 | Anderson et al. | |
| 2010/0124931 A1 | 5/2010 | Eskicioglu et al. | |
| 2010/0135178 A1 | 6/2010 | Aggarwal et al. | |
| 2010/0144368 A1 | 6/2010 | Sullivan | |
| 2010/0159951 A1* | 6/2010 | Shkedi | 455/456.1 |
| 2010/0172259 A1 | 7/2010 | Aggarwal et al. | |
| 2010/0189236 A1 | 7/2010 | MacDonald et al. | |
| 2010/0190509 A1 | 7/2010 | Davis et al. | |
| 2010/0195566 A1 | 8/2010 | Krishnamurthy et al. | |
| 2010/0203903 A1 | 8/2010 | Dingler et al. | |
| 2010/0207470 A1 | 8/2010 | Kim et al. | |
| 2010/0220665 A1* | 9/2010 | Govindan et al. | 370/329 |
| 2010/0222075 A1 | 9/2010 | Miura | |
| 2010/0227589 A1 | 9/2010 | Cook et al. | |
| 2010/0250542 A1 | 9/2010 | Fujimaki | |
| 2010/0299060 A1 | 11/2010 | Snavely et al. | |
| 2010/0311437 A1 | 12/2010 | Palanki et al. | |
| 2010/0313157 A1 | 12/2010 | Carlsson et al. | |
| 2011/0009068 A1 | 1/2011 | Miura | |
| 2011/0010085 A1 | 1/2011 | Tanaka et al. | |
| 2011/0023129 A1 | 1/2011 | Vernal | |
| 2011/0053609 A1 | 3/2011 | Grogan et al. | |
| 2011/0060808 A1 | 3/2011 | Martin et al. | |
| 2011/0065450 A1 | 3/2011 | Kazmi | |
| 2011/0072034 A1 | 3/2011 | Sly | |
| 2011/0076975 A1 | 3/2011 | Kim et al. | |
| 2011/0077032 A1 | 3/2011 | Correale et al. | |
| 2011/0161261 A1 | 6/2011 | Wu et al. | |
| 2011/0164596 A1 | 7/2011 | Montemurro et al. | |
| 2011/0171912 A1 | 7/2011 | Beck et al. | |
| 2011/0172905 A1 | 7/2011 | Schroder et al. | |
| 2011/0205964 A1 | 8/2011 | Fix et al. | |
| 2011/0207470 A1 | 8/2011 | Meredith et al. | |
| 2011/0210843 A1 | 9/2011 | Kummetz et al. | |
| 2011/0210849 A1 | 9/2011 | Howard et al. | |
| 2011/0244879 A1 | 10/2011 | Siomina et al. | |
| 2011/0271331 A1 | 11/2011 | Adams | |
| 2011/0296169 A1 | 12/2011 | Palmer | |
| 2011/0319098 A1 | 12/2011 | Potorny et al. | |
| 2012/0016902 A1 | 1/2012 | Ranjan et al. | |
| 2012/0025976 A1 | 2/2012 | Richey et al. | |
| 2012/0028650 A1 | 2/2012 | Cooper et al. | |
| 2012/0030083 A1 | 2/2012 | Newman et al. | |
| 2012/0052884 A1 | 3/2012 | Bogatin | |
| 2012/0062415 A1 | 3/2012 | Hwang et al. | |
| 2012/0087338 A1 | 4/2012 | Brandt et al. | |
| 2012/0139782 A1 | 6/2012 | Gutt et al. | |
| 2012/0158289 A1 | 6/2012 | Bernheim Brush et al. | |
| 2012/0182874 A1 | 7/2012 | Siomina et al. | |
| 2012/0317500 A1 | 12/2012 | Kosseifi et al. | |
| 2012/0323703 A1 | 12/2012 | Hillier et al. | |
| 2013/0007058 A1 | 1/2013 | Meredith et al. | |
| 2013/0023237 A1 | 1/2013 | Meredith et al. | |
| 2013/0023274 A1 | 1/2013 | Meredith et al. | |
| 2013/0023281 A1 | 1/2013 | Meredith et al. | |
| 2013/0281111 A1 | 10/2013 | Syrjarinne et al. | |
| 2013/0324149 A1 | 12/2013 | Fix et al. | |
| 2014/0062782 A1 | 3/2014 | Abraham | |
| 2014/0171060 A1 | 6/2014 | Cook et al. | |

OTHER PUBLICATIONS

Office Action dated Dec. 15, 2011 for U.S. Appl. No. 12/712,424, 34 pages.
Office Action dated Dec. 28, 2011 for U.S. Appl. No. 12/836,471, 34 pages.
Office Action dated Feb. 23, 2012 for U.S. Appl. No. 12/967,747, 31 pages.
OA dated Oct. 2, 2012 for U.S. Appl. No. 13/554,285, 19 pages.
OA dated Aug. 30, 2012 for U.S. Appl. No. 12/958,146, 40 pages.
MobileLutions Introduces MobiLoc-A Breakthrough Technology to Control Texting in the Mobile Workplace. Press release Oct. 10, 2010 by MobileLutions. 2 pages.
DriveAssist Frequently Ask question by Aegis Mobility, Wayback archive Jul. 12, 2010, 3 pages.
OA dated Jul. 30, 2012 for U.S. Appl. No. 12/967,747, 28 pages.
OA dated Jul. 17, 2012 for U.S. Appl. No. 13/220,083, 57 pages.
OA dated Sep. 11, 2012 for U.S. Appl. No. 13/188,345, 44 pages.
International Search Report for PCT Application No. US2011/026122 dated Sep. 10, 2011, 11 pages.
International Search Report for PCT Application No. US2011/026120 dated Sep. 9, 2011 13 pages.
Charitanetra et al. "Mobile positioning location using E-OTD method for GSM network" Research and Development, 2003. Proceedings Student Conference on Putrajaya, Malaysia Aug. 25-26, 2003, pp. 319-324.
"Location Labs Powers Location-based Fraud Detection", All Points Blog, http://webcache.googleusercontent.com/search?hl=en&rlz=1R2GFRE_enUS398&q=cache:trsMn9Sin6wJ:http://apb.directionsmag.com/entry/location-labs-powers-location-based-fraud-detection/162802+http%3A//apb.directionsmag.com/entry/location-labs-powers-location-based-...1&ct=clnk, Oct. 12, 2010.
"Location Based Fraud Detection", Finsphere Corporation, 2008-2010.
Cortes, et al. "Support-Vector Networks", Machine Learning, 20, 1995. http://www.springerlink.com/content/k238jx04hm87j80g/fulltext.pdf. Last accessed Dec. 24, 2010, 25 pages.
ACM Website, Press release of Mar. 17, 2009. http://www.acm.org/press-room/news-releases/pdfs/awards-08-groupa1.pdf. Last accessed Dec. 24, 2010, 3 pages.
Boser, et al. A training algorithm for optimal margin classifiers. In D. Haussler, editor, 5th Annual ACM Workshop on COLT, pp. 144-152, Pittsburgh, PA, 1992. ACM Press. http://citeseerx.ist.psu.edu/viewdoc/sumunary?doi=10.1.1.21.3818. Last accessed Dec. 24, 2010, 9 pages.
Hsu, et al. A Practical Guide to Support Vector Classification. Department of Computer Science National Taiwan University, Last updated: Apr. 15, 2010. http://www.csie.ntu.edu.tw/~cjlin/papers/guide/guide.pdf. Last accessed Dec. 24, 2010, 16 pages.
Drucker, et al. Support Vector Regression Machines. http://scholar.google.com/scholar?q=%22Support+Vector+Regression+Machines.%22. Last accessed Dec. 24, 2010, 7 pages.
New Devices Aim to Disable Cell Phones While Driving. FOXNews.com, Jan. 18, 2009. http://www.foxnews.com/printer_friendly_story/0,3566,480585,00.html. Last accessed Nov. 24, 2010, 2 pages.
3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.
3rd Generation Partnership Project, Technical Specification, "Group Radio Access Network, UTRAN Iuh interface Node B Application Part (NBAP) signalling (Release 8)", 3GPP TS 25.469 V8.0.0 (Dec. 2008), last viewed Jul. 1, 2009, 56 pages.
Sullivan, Mark. "Signs and Wonders: Is AT&T Stepping Up Its Game?" PC World, Dec. 10, 2009, 1 page.
ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.

(56) References Cited

OTHER PUBLICATIONS

ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.
Suykens et al., "Least squares support vector machine classifiers", Neural Processing Letters, vol. 9, No. 3, Jun. 1999, pp. 293-300.
Ferris et al. (2002). "Interior-point methods for massive support vector machines". SIAM Journal on Optimization 13: 783-804. doi:10.1137/S1052623400374379.
Meyer et al. "The support vector machine under test." Neurocomputing 55(1-2): 169-186, 2003.
Non-Final Office Action dated Sep. 19, 2013, for U.S. Appl. No. 13/927,020, 30 pages.
Non-Final Office Action dated Oct. 2, 2013 for U.S. Appl. No. 12/958,146, 31 pages.
Non-Final Office Action dated Sep. 26, 2013 for U.S. Appl. No. 13/284,456, 58 pages.
RouteFinder 3.00 for ArGIS Documentation, © 2007 Routeware and Higher Mapping Solutions, 71 pages, downloaded from http://www.routeware.dk/download/routefinder_arcgis.pdf.
MySociety (Web page), "More travel-time maps and their uses", 2007, downloaded from http://www.mySociety.org/2007/more-travel-maps/, 10 pages total (including a single page Examiner's attachment showing the operation of the interactive travel-time map).
Wayback machine archive from Jan. 21, 2009 of the mySociety Web page, "More travel-time maps and their uses", downloaded from http://web.archive.org/web/20090121193615/http://www.mysociety.org/2007/more-travel-maps/, 11 pages.
Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.
Non-Final Office Action dated Nov. 5, 2013 for U.S. Appl. No. 13/188,136, 47 pages.
Final Office Action dated Sep. 18, 2013, for U.S. Appl. No. 13/284,497, 30 pages.
Final Office Action dated Aug. 22, 2013, for U.S. Appl. No. 13/277,595, 36 pages.
Final Office Action dated Oct. 21, 2013, for U.S. Appl. No. 13/523,770, 24 pages.
Office Action dated Nov. 5, 2013 for U.S. Appl. No. 13/188,345, 30 pages.
OA dated Oct. 15, 2012 for U.S. Appl. No. 13/523,778, 21 pages.
OA dated Dec. 20, 2012 for U.S. Appl. No. 12/958,146, 23 pages.
OA dated Nov. 8, 2012 for U.S. Appl. No. 13/204,535, 30 pages.
OA dated Jan. 3, 2013 for U.S. Appl. No. 13/188,300, 36 pages.
Final Office Action dated Jan. 25, 2013, for U.S. Appl. No. 13/554,285, 20 pages.
Non-Final Office Action dated Mar. 19, 2013, for U.S. Appl. No. 13/174,541, 46 pages.
Final Office Action dated Feb. 13, 2013, for U.S. Appl. No. 13/220,083, 48 pages.
Final Office Action dated Feb. 22, 2013, for U.S. Appl. No. 13/188,345, 45 pages.
Final Office Action dated Mar. 15, 2013, for U.S. Appl. No. 13/204,535, 18 pages.
Non-Final Office Action dated Mar. 19, 2013, for U.S. Appl. No. 13/284,497, 46 pages.
Non-Final Office Action dated Apr. 19, 2013, for U.S. Appl. No. 13/277,595, 58 pages.
Notice of Allowance mailed Aug. 12, 2013, for U.S. Appl. No. 13/174,541, 40 pages.
Final Office Action dated Aug. 2, 2013, for U.S. Appl. No. 13/188,300, 38 pages.
Non-Final Office Action dated Jun. 20, 2013, for U.S. Appl. No. 13/219,911, 61 pages.
Non-Final Office Action dated Jul. 17, 2013, for U.S. Appl. No. 13/188,345, 27 pages.
Non-Final Office Action dated Jun. 20, 2013, for U.S. Appl. No. 13/291,917, 52 pages.
Non-Final Office Action dated May 31, 2013, for U.S. Appl. No. 13/523,770, 40 pages.
Non-Final Office Action dated Dec. 24, 2013, for U.S. Appl. No. 13/188,300, 44 pages.
Final Office Action dated Dec. 11, 2013, for U.S. Appl. No. 13/291,917, 34 pages.
Final Office Action dated Jan. 15, 2014 for U.S. Appl. No. 13/219,911, 38 pages.
Final Office Action dated Jan. 28, 2014, for U.S. Appl. No. 12/958,146, 24 pages.
Notice of Allowance dated Feb. 14, 2014 for U.S. Appl. No. 13/284,456, 30 pages.
Final Office Action dated Feb. 24, 2014, for U.S. Appl. No. 13/927,020, 18 pages.
Fleishman. Using the Personal Hotspot on your AT & T iPhone. Published online Mar. 15, 2011. http://www.macworld.com/article/158556/2011/03/personal_hotspot_att . . . , 4 pages.
Fleischfresser. Never Stop at a Red-Light Again. Published online Aug. 30, 2011. http://www.smartplanet.com/blog/ . . . , 2 pages.
Cellphone Networks and the Future of Traffic. Published online Mar. 2, 2011. http://m.wired.com/autopia/2011/03/cell-phone-networks-and-the-future- . . . 15 pages.
Ban Xuegang(Jeff), Gruteser Marco. Mobie Sensor as Traffic Probes: Addressing Transportation Modeling and Privacy Protection in an Integrated Framework. Dated Jan. 10, 2010. 17 pages.
Marko Silventoinen, et al., "Mobile Station Locating in GSM" Helsinki, Finland, Last accessed on Nov. 15, 2011, 7 pages.
Office Action dated Dec. 30, 2013 for U.S. Appl. No. 13/305,267, 10 pages.
Office Action dated May 21, 2013 for U.S. Appl. No. 13/305,276, 28 pages.
Office Action dated Oct. 24, 2012 for U.S. Appl. No. 13/305,276, 37 pages.
"Locate your friends in real time with Google Latitude." http://googlemobile.blogspot.com/2009/02/locate-your-friends-in-real-time-with.html. Last accessed Mar. 8, 2012, 23 pages.
"Location sharing and updating." http://support.google.com/mobile/bin/answer.py?hl=en&answer=136647. Last accessed Mar. 8, 2012, 3 pages.
"Privacy Settings." http://support.google.com/mobile/bin/answer.py?hl=en&answer=136650, Last accessed Mar. 8, 2012, 1 page.
Office Action dated Nov. 25, 2013 for U.S. Appl. No. 13/447,069, 40 pages.
Office Action dated May 9, 2013 for U.S. Appl. No. 13/447,069, 33 pages.
Tsai, et al, "Location-Sharing Technologies: Privacy Risks and Controls." Feb. 2010. Retrieved on May 10, 2013, 26 pages.
Li et al, "Sharing Location in Online Social Networks". IEEE Network, Sep./Oct. 2010; 0890-8044/10/$25.00 (c)2010 IEEE. Retrieved on May 10, 2013, 6 pages.
Tsai, et al, "Who's Viewed You? The Impact of Feedback in a Mobile Location-Sharing Application". CHI 2009—Security and Privacy, Apr. 9, 2009—Boston, MA, USA. Retrieved on May 10, 2013, 10 pages.
Pettersen, et al., "Automatic antenna tilt control for capacity enhancement in UMTS FDD." Retrieved on Mar. 25, 2012, 5 pages.
Islam, et al., "Self-Optimization of Antenna Tilt and Pilot Power for Dedicated Channels." Retrieved on Mar. 25, 2012, 8 pages.
Bigham, et al., "Tilting and Beam-shaping for Traffic Load Balancing in WCDMA Network." Retrieved on Mar. 25, 2012, 4 pages.
3GPP TS 25.215 V6.4.0 (Sep. 2005) Physical Layer Measurements.
3GPP TS 25.331 V6.9.0 (Mar. 2006) RRC protocol for the UE-UTRAN radio interface.
3GPP TS 25.413 V6.9.0 (Mar. 2006) UTRAN Iu interface RANAP signalling.
Calabrese, et al., "Real-Time Urban Monitoring Using Cell Phones: A Case Study in Rome". IEEE Transactions on Intelligent Transportation Systems, 12 pages. (http://senseable.mit.edu/papers/pdf/2010_Calabrese_et_al_Rome_TITS.pdf). Retrieved on Sep. 29, 2012, 11 pages.

(56) References Cited

OTHER PUBLICATIONS

Smith, et al., "Airsage Overview", (http://mikeontraffic.typepad.com/files/raleigh-winter-2011-presentation-v11-final.pdf) Retrieved on Sep. 29, 2012, 39 pages.
Office Action dated Feb. 5, 2014 for U.S. Appl. No. 13/526,988, 56 pages.
Office Action dated Mar. 25, 2014 for U.S. Appl. No. 13/488,144, 60 pages.
Interview Summary dated Feb. 3, 2014 for U.S. Appl. No. 13/188,136, 10 pages.
Rabinowitz, et al., A new positioning system using television synchronization signals, IEEE Transactions on Broadcasting, vol. 51(1), p. 51-61, Mar. 2005.
Office Action dated Apr. 8, 2014 for U.S. Appl. No. 13/175,199, 52 Pages.
Office Action dated Apr. 23, 2014 for U.S. Appl. No. 13/291,917, 29 Pages.
Office Action dated Apr. 22, 2014 for U.S. Appl. No. 13/447,069, 51 Pages.
Office Action dated Sep. 20, 2012 for U.S. Appl. No. 12/870,254, 29 pages.
Office Action dated May 14, 2014 for U.S. Appl. No. 13/660,689, 62 pages.
Office Action dated May 9, 2014 for U.S. Appl. No. 13/188,136, 33 pages.
Squires, "Practical Physics", Cambridge University Press, p. 12, 1986, 3 pages.
Represent (2000). In Collins English dictionary. Retrieved on May 9, 2014 from http://search.credoreference.com/content/entry/hcengdict/represent/0, 2 pages.
Represent. (2001). In Chambers 21st century dictionary. Retrieved on May 9, 2014 from http://search.credoreference.com/content/entry/chambdict/represent/O.
Represent. (2011). In The american heritage dictionary of the english language. Retrieved on May 9, 2014 from http://search.credoreference.com/content/entry/hmdictenglang/represent/0.
Non-Final Office Action dated May 20, 2014 for U.S. Appl. No. 13/551,369, 29 pages.
Non-Final Office Action dated May 30, 2014 for U.S. Appl. No. 13/277,595, 49 pages.
Non-Final Office Action dated Jun. 3, 2014 for U.S. Appl. No. 13/523,770, 53 pages.
Non-Final Office Action dated Jun. 6, 2014 for U.S. Appl. No. 13/447,072, 25 pages.
Office Action dated Jun. 18, 2014 for U.S. Appl. No. 13/305,276, 26 Pages.
Office Action dated Jun. 26, 2014 for U.S. Appl. No. 13/557,425, 24 Pages.
Office Action dated Jun. 30, 2014 for U.S. Appl. No. 13/305,267, 44 Pages.
Office Action dated Jul. 22, 2014 for U.S. Appl. No. 12/958,146, 38 Pages.
Notice of Allowance dated Jul. 22, 2014 for U.S. Appl. No. 13/525,065, 82 Pages.
Notice of Allowance dated Jul. 22, 2014 for U.S. Appl. No. 13/188,300, 49 Pages.
Office Action dated Aug. 8, 2014 for U.S. Appl. No. 13/284,497, 48 pages.
Office Action dated Aug. 11, 2014 for U.S. Appl. No. 14/279,176, 22 pages.
Notice of Allowance dated Aug. 21, 2014 for U.S. Appl. No. 13/447,069, 78 pages.
Office Action dated Aug. 28, 2014 for U.S. Appl. No. 13/526,988, 83 pages.
Office Action dated Sep. 22, 2014 for U.S. Appl. No. 13/175,199, 62 pages.

* cited by examiner

US 8,892,112 B2

SELECTION OF A RADIO ACCESS BEARER RESOURCE BASED ON RADIO ACCESS BEARER RESOURCE HISTORICAL INFORMATION

CROSS-REFERENCE TO RELATED APPLICATIONS

This application is related to U.S. Ser. No. 12/712,424, filed Feb. 25, 2010, now issued as U.S. Pat. No. 8,224,349, on Jul. 17, 2012, which is hereby incorporated by reference in its entirety.

TECHNICAL FIELD

The disclosed subject matter relates to selection of bearer resource technologies and, more particularly, to bearer resource technology selection through analysis of historical data associated with a bearer technology resource.

BACKGROUND

Conventionally, radio access bearer (RAB) handover for user equipment (UE) can be based on data transmission provisioning information and available data transmission resources. RAB handover can thus be characterized as occurring when a need for a handover is determined and the resource is determined to be available. The conventional RAB handover process is typically ignorant of information that can indicate that a potential RAB handover can result in binding a RAB that may not meet the perceived need. For example, where a RAB handover is initiated for a UE from a first RAB to a second RAB that is known to be going in and out of service, connection to the second RAB can actually result in the performance of the UE decreasing as the second RAB fluctuates between in and out of service. However, the conventional RAB handover can be ignorant of the condition of the second RAB and proceed with the handover despite the potential degraded performance for the UE.

The above-described deficiencies of conventional selection or RAB resources are merely intended to provide an overview of some of problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Various embodiments relate to selecting a radio access bearer resource. In one example embodiment, a system comprises a location determination component to determine a location, the location facilitating receiving historical information related to a radio access bearer resource associated with the location. The exemplary system further comprises a radio access bearer analysis component to designate a value to a radio access bearer resource. This value can be designated based on the radio access bearer resource satisfying a predetermined condition relating to the historical information. The designated value can e employed to rank or order radio access bearer resources.

In another example embodiment, a method comprises receiving location information for a user equipment. The example method further comprises selecting a radio access bearer resource from a radio access bearer resources covering the location. The selection can be based on historical information associated with the radio access bearer resource.

In another example embodiment, a computing device comprises a process configured to receive location information for a user equipment. The processor can further process the location information to determine historical information related to a radio access bearer resource. Moreover, the processor can be configured to designate a value to the radio access bearer resource based on the historical information satisfying a predetermined condition. The designated value can be employed to select a radio access bearer resource.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings.

DETAILED DESCRIPTION

Figure 1:
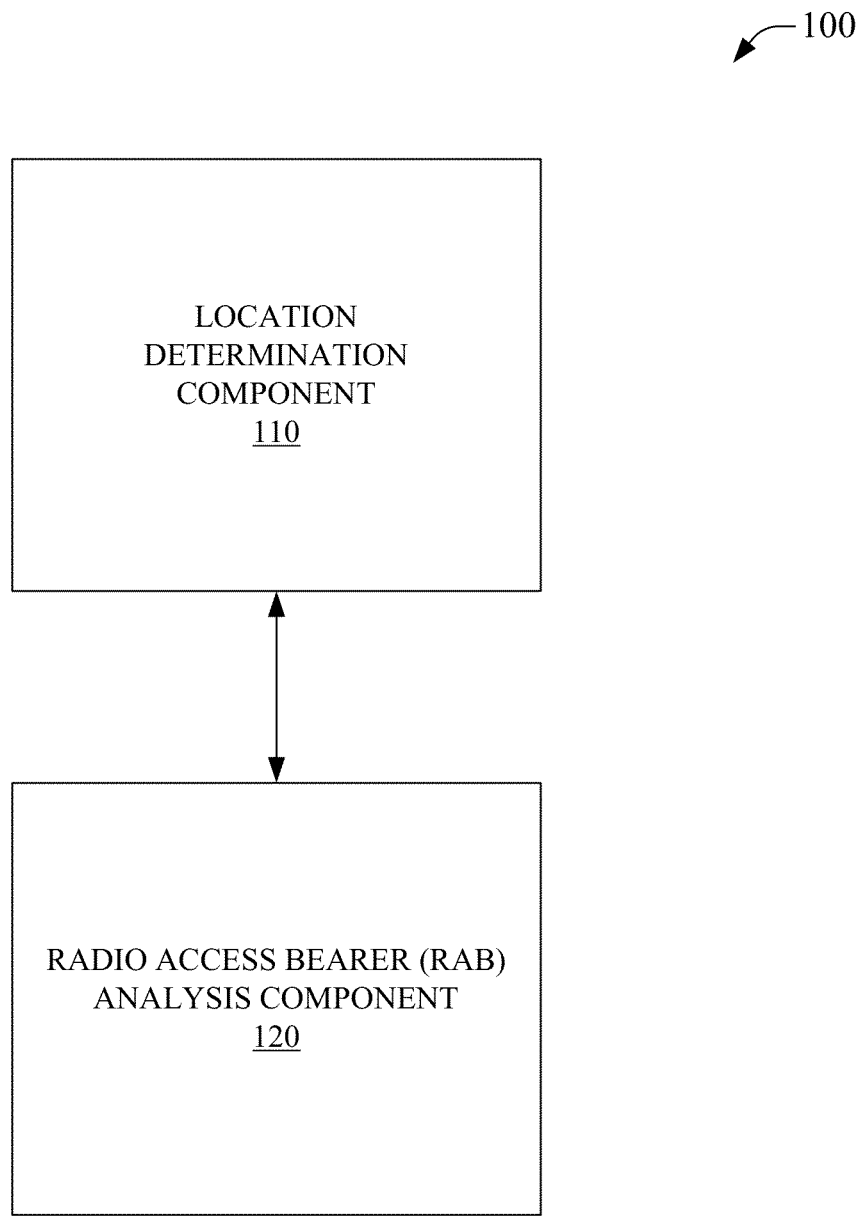
FIG. 1 is an illustration of a system that facilitates selection of a radio access bearer resource based on historic information related to the radio access bearer resource in accordance with aspects of the subject disclosure.

In contrast to conventional RAB resource selection techniques or systems, the presently disclosed subject illustrates selection of a radio access bearer resource based on historic information related to the radio access bearer resource. Thus, wherein conventional RAB selection is typically ignorant of non-contemporaneous parameters, the disclosed subject matter can incorporate the history of a RAB resource in determining if that RAB resource is to be selected in a RAB handover. For example, where two RAB resources are available for a RAB handover event, historical information for both RAB resources can be employed in the selection process for the presently disclosed subject matter. As such, in this example, where historical information indicates that prior handoffs to the first of the two RAB resources frequently is followed by a loss of connection with the UE, and no such history is indicated for the second of the two RAB resources, the historical information can influence the RAB resource selection process such that the second RAB resource can be selected in the RAB handover process. Of note, the instant disclosure includes multiple RAB (mRAB) resource selection as a subset of RAB resource selection, such that selection of more than one RAB resource during a RAB handover is within the scope of the present disclosure for selection of a RAB resource. Of further note, a RAB handover can include one or more of a "softer handover", wherein a UE combines more than one radio link to improve the reception quality; a "soft handover", wherein a UE combines more than one radio link belong to more than one node B to improve the reception quality; a "hard handover", wherein radio links for a UE change and there are no radio links that are common before the procedure is initiated and after the procedure is completed, the hard handover can include inter-frequency and intra-frequency handovers; a "Serving Radio Network Subsystem (SRNS) Relocation-type handover", wherein the UE is active on a resource that belongs to a different radio network controller; or other types of RAB resource handover.

A Radio Access Bearer (RAB) resource, as put forth by the Third Generation Partnership Project (3GPP or 3G), can be a user plane connection provided by a 3GPP Universal Mobile Telecommunications System (UMTS) Terrestrial Radio Access Network (UTRAN) between a User Equipment (UE) and a wireless network provider, such as a cellular telephone carrier. Of note, the instant disclosure includes RAB resources paralleled in other current and future standards and/or RAN systems such as long term evolution (LTE), evolved UTRAN (e-UTRAN), 4G, etc. Often, RAB characteristics (e.g., data rates, Quality of Service (QoS), etc.) can set by the wireless network provider, e.g., based on subscription parameters or requirements of media employing the RAB. The RAB configuration can influence network resource usage. That is, where the RAB configuration is well configured to the actual data being transferred, the RAB is more efficient in terms of usage of network resources than when it is poorly configured to the data being transferred. Selecting proper RAB parameters provides for more efficient use of the limited resources of a UTRAN. Typically, data is transferred, between a Radio Network Controller (RNC) and a UE, inside frames whose length is within parameters for allowed frame sizes. The parameters for allowed frame sizes can be configured when the RAB is setup. A RAB bandwidth parameter can be used to determine the QoS allotted to an application and the parameters for allowed frame sizes for a RAB can defines the amount of bandwidth wasted to pad the data inside a designated frame size. Selecting a RAB that is more closely configured to data being transmitted can reduce wasted resources, such as by reducing the padding in oversized frames.

The transmission of data within a RAB in UMTS can include data (e.g., internet protocol (IP) packets) generated by an application at a UE which can be stored in an internal buffer. The data can be transmitted periodically, e.g., the buffer can be emptied periodically, typically at every Transmission Time Interval (TTI), when a radio frame is created to include the data, e.g., the data stored at the buffer up to a predetermined maximum frame size (MFS). Where the amount of data in the buffer is less than MFS, the data can be padded up to the frame size or a frame of size smaller than MFS may be created. Once the frame has been created, it can be transported through the air interface to a NodeB, where an IP packet containing the frame can be generated for transport over a Radio Access Network (RAN) to the RNC. The RNC can terminate the radio protocol by extracting the radio frames from the IP packet, and the data from these frame. The data padding can be discarded. The wireless network provider network can then facilitate the further transmission of the data.

In an aspect, location information for a UE can be employed to facilitate access to historic information related to RAB resources. For example, historic information for a period of time can be accessed for a region when a UE is determined to be in or near said region. As such, in this example, RAB histories for RAB resources in a region around a mobile device can be received, RAB histories for RAB resources in a region in which a mobile device is present can be received, RAB histories for RAB resources in a region in which a mobile device is expected to enter can be received, etc. Location information can be based on nearly any form of location technology, including, global positioning system (GPS), enhanced GPS (eGPS), triangulation, multilateration, proximity sensing, timed fingerprint location (TFL, as disclosed more fully in the application incorporated herein by reference), inertial sensing, etc. The use of location information in accessing historic RAB resource information can be beneficial, for example, RAB resources that may not have been detected by a UE can be considered allowing consideration of RAB resources in a region that a UE has not yet entered in contrast to waiting until the UE has entered the region and/or detected available RAB resources therein before interrogating the historical information relating to the RAB resources therein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

FIG. 1 is an illustration of a system 100, which facilitates selection of a radio access bearer resource based on historic information related to the radio access bearer resource in accordance with aspects of the subject disclosure. System 100 can include location determination component 110. Location determination component 110 can facilitate access to location information. Location information can be based on nearly any form of location technology, including, GPS, enhanced GPS (eGPS), triangulation, multilateration, proximity sensing, TFL, inertial sensing, etc. For example, a location can be determined from a GPS component of a UE. As a second example, a TFL component of a UE can provide a location.

System 100 can further include radio access bearer (RAB) analysis component 120. RAB analysis component 120 can be communicatively coupled to location determination component 110. RAB analysis component 120 can facilitate the analysis of one or more RAB resources. In an aspect, a RAB resource can be analyzed based on location information, e.g., location information from location determination component 110. For example, a location can be determined by location determination component 110. This location can be correlated with a RAB resource. RAB analysis component 120 can analyze the RAB resource correlated with the location determined by location determination component 110. Continuing the present example, the analysis can include the determination of the contemporaneous characteristics (e.g., bandwidth, QoS, etc.) of the correlated RAB resource and historical information related to the RAB resource. Historical information related to the RAB resource can include nearly any type of data and can include, historical characteristic information, historical performance information, historical repair information, historical performance of devices bound to the RAB resource, e.g., performance of an established channel on the RAB resource, etc., or nearly any other type of information cataloged and correlated with the RAB resource.

RAB analysis component 120 can analyze a RAB resource to facilitate determining the suitability of selecting a RAB resource for a handover event. RAB handover events, including establishing mRAB channels on the same or different RAB layers, can include determining the suitability of a radio network layer to bear data. Typically, selecting a RAB that is more closely configured to data being transmitted can reduce wasted resources and be more suitable for selection than layers that have characteristics that result in less efficient use of RAN resources. As such, consideration of these contemporaneous characteristics of a RAB resource can be included in analysis of a RAB resource. However, historical information can also be employed in the analysis. As such, even where a RAB resource can be closely configured to the data to be conducted, where the past performance of the RAB resource indicates undesirable characteristics, the RAB resource can be determined to be less suitable than other RAB resources. For example, where a first RAB resource is more closely configured to carry data than a second RAB resource, the first RAB resource would typically be selected as the most suitable. However, where historic performance of the first RAB resource indicates that data connections are frequently lost, this factor can be considered in an analysis by RAB analysis component 120, such that the second RAB resource is ranked as more suitable that the first RAB resource despite being less closely configured for the data.

As a non-limiting example, assume that radio frequency (RF) propagation losses are much higher at 1900 MHz than 800 MHz and that a subscriber is conducting a voice call on a UE at 1900 MHz when the need to transmit data to the device from the RAN compels the establishment of an mRAB. Further, assume the UE has historical transmission power levels on an uplink and downlink, one of which is deemed insufficient, by analysis of RAB resources by a RAB analysis component 120, to reliably support an mRAB channel on a RAB resource of the 1900 MHz layer. The analysis of available RAB resources can thus result in selection of an 800 MHz RAB resource for the exemplary mRAB handover because RF path loss is lower on the 800 MHz layer. As such, a greater power margin and a better likelihood of reliably supporting the mRAB after handover for both voice and data can be indicated by the exemplary analysis. Of note, the mechanism for selecting such an exemplary handover can be the same as, or similar to, that employed in UMTS called service based handover that can cause handovers based on communication service types.

In an embodiment, RAB analysis component 120 can also take into account the classifications of data for transmission. Data classification can include, for example, voice classification, data classification, VoIP data classification, streaming data classification, etc., which classifications can be considered in determinations of risk related to data loss. For example, loss of voice data can be ranked as less acceptable than loss of streaming data class or data in a buffered data stream class, etc. Analysis of RAB resources, by RAB analysis component 120, to weigh the risks of, for example, a voice or data session failing during handover against, for example, not selecting a RAB resource to prevent the handover associated with corresponding buffering or loss of data can be performed. Where RAB resources can be associated with some potential for data loss, the historical information for a RAB resource can provide for quantification of said data loss potential. As such, historical information related to RAB resources can be employed in balancing acceptable data loss parameters against selection of a RAB resource for a potential handover event.

In some embodiments, RAB analysis component 120 can employ one or more rules in analyzing a RAB resource. A rule can be an algorithm or other logic employed in analysis of a RAB resource, such as selecting a RAB resource from a set of RAB resources. As a non-limiting example, a rule can be employed to rank or order a set of RAB resources such that a subset of the RAB resources includes RAB resources ranked or ordered by, for instance, reliability, risk of data loss, bandwidth, success of handover, sustainability of handover, QoS, etc. Thus, a RAB resource can be analyzed and ranked based on both a contemporaneous characteristic and/or historical information associated with the RAB resource. Ranked subsets of RAB resources can facilitate selection of a RAB resource for a handover event, e.g., selection of the highest ranked RAB resource. For example, a RAB resource with a history of sustained handoffs can be selected where it is ranked higher than a RAB resource indicating a history of less sustained handoffs. It is noteworthy that a nearly limitless number of other exemplary permutations can be presented to illustrate the benefits of analysis of historical information associated with RAB resources in the selection of a RAB resource for a handover event, but further enumeration of examples are truncated simply for brevity and clarity, though all other permutations are to be considered within the scope of the present disclosure.

Figure 2:
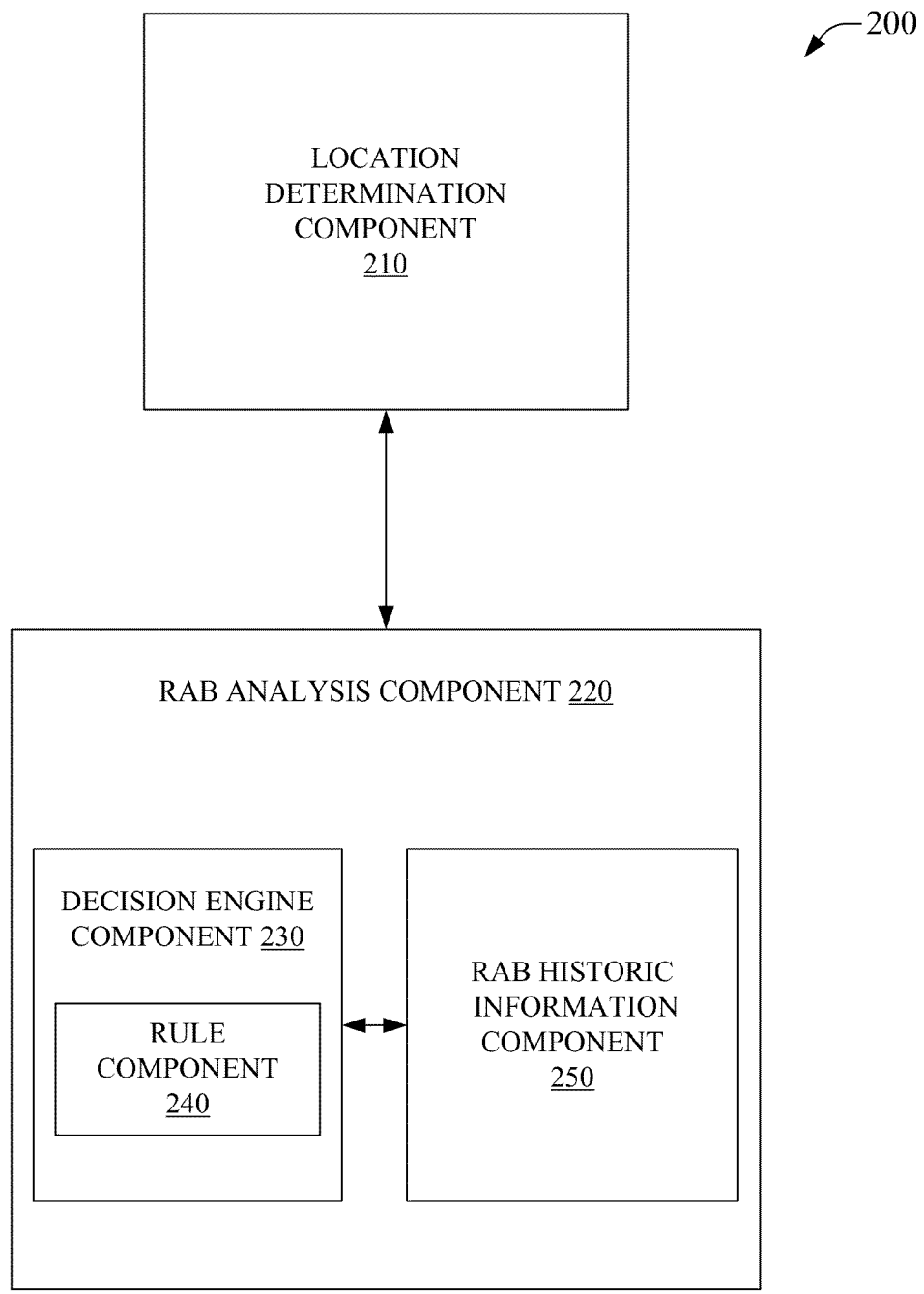
FIG. 2 is a depiction of a system that facilitates selection of a radio access bearer resource based on historic information related to the radio access bearer resource in accordance with aspects of the subject disclosure.

FIG. 2 is a depiction of a system 200 that can facilitate selection of a radio access bearer resource based on historic information related to the radio access bearer resource in accordance with aspects of the subject disclosure. System 200 can include location determination component 210. Location determination component 210 can facilitate access to location information. Location information can be based on nearly any form of location technology, including, GPS, enhanced GPS (eGPS), triangulation, multilateration, proximity sensing, TFL, inertial sensing, etc.

System 200 can further include RAB analysis component 220. RAB analysis component 220 can be communicatively coupled to location determination component 210. RAB analysis component 220 can facilitate the analysis of one or more RAB resources. In an aspect, a RAB resource can be analyzed based on location information, e.g., location information from location determination component 210. Further, RAB analysis component 220 can analyze contemporaneous information related to a RAB, historical information related to a RAB resource, or combinations thereof. RAB analysis component 220 can include decision engine component 230.

Decision engine component 230 of system 200 can facilitate forming determinations relating to RAB resources. Determinations can include selection of a RAB resource, e.g., selecting a RAB resource for a handover, ranking RAB resources, designating that a suitable RAB resource is not available, or combinations thereof. For example, where location information is employed to receive information relating to a plurality of RAB resources for a given region, said RAB resources can be ranked in order of highest to lowest suitability for a RAB handover for a particular data class, ranked in order of longest to shortest historically sustained handovers, e.g., ranking which handovers in the past resulted in the most sustained data connections and which resulted in poor data connections that dropped quickly, designation of a specific RAB resource from the plurality that is the most suitable for a data stream, designation that no RAB resource from the plurality is appropriate for a handover, e.g., a RAB handover event defacto cannot occur because no suitable bearer is available, etc.

In an aspect, decision engine component 230 can include rule component 240 to facilitate forming determinations related to a RAB resource. Rule component 240 can facilitate employing one or more rules, such as rules for selecting a RAB resource, ranking a RAB resource, rules for including a RAB resource in a subset of RAB resources, etc. In an embodiment, rule component 240 can be a rule engine that allows the application of logical determinations to be embodied in one or more algorithms related to the analysis of a RAB resource. As a non-limiting example, rule component 240 can generate a rule that alters a ranking of a RAB resource based on a historical information related to the RAB resource, such as increasing a ranking score where the RAB resource historically is associated with highly sustained handovers or decreasing a ranking score where the RAB resource historically is associated with interrupted data connections at or near a handover. As a second non-limiting example, rule component 240 can generate a rule that alters a ranking of a RAB resource based on a historical information related to the RAB resource, such as conditionally decrementing a ranking during a peak usage period based on historic overload of said RAB resource during peak usage hours, e.g., where the RAB resource historically is overloaded the use of said RAB resource can be associated with lower levels of bearer functionality.

In other embodiments, rule component 240 can directly apply predetermined rules to selection of a RAB resource. For example, rule component 240 can apply a location-forecasting rule that projects the future location of a UE based on the present or historic location information associated with the UE. The exemplary location-forecasting rule can, for instance, indicate that a UE will be at a certain location at a certain time based on the current location and rate of speed of the UE based on the present location of the UE and the recent historical locations of the UE. More specifically, in this non-limiting example, where a UE is determined to be traveling at 60 miles per hour (MPH) along a freeway and is further determined to be 1 mile from the next exit ramp along that freeway, a forecast can be determined that the UE will be at or near the next exit in 60 seconds. In contrast, where the UE is determined to be at the same location but only traveling at 40 MPH, the forecast time to the next exit ramp could be computed as between 90 seconds. Where a RAB resource is associated with the future location, e.g., near the next exit, the forecast location of the UE can be valuable in proactively selecting a RAB resource. Continuing the example, it can be determined that waiting 90 seconds is excessive while waiting 60 seconds is not and, as such, where the UE is traveling at 60 MPH, a RAB handover can be delayed until the UE is in range of the RAB resource in contrast to the UE traveling at 40 MPH where an alternative RAB resource can be selected rather than waiting 90 seconds for the RAB resource to be in range. Further explicit examples are not provided for brevity but all such examples are to be considered within the scope of the present disclosure.

System 200 can further include RAB historic information component 250. RAB historic information component 250 can facilitate receiving historical information related to a RAB resource. RAB historic information component 250 can include local, remote, or distributed data stores including RAB resource data and other historical information related to a RAB resource. For example, RAB historic information component 250 can facilitate access to historic RAB resource characteristic information, e.g., bandwidth, QoS, power levels for uplink and downlink, min/max/average data channel link times, etc. As a second example, RAB historic information component 250 can facilitate access to data relating to a RAB resource, such as, prior ranking of the RAB resource, proximity of a RAB resource to other RAB resources, maintenance records for systems supporting the RAB resource, etc. RAB historic information component 250 can be communicatively coupled to decision engine component 230 of RAB analysis component 220 to facilitate the selection of a RAB resource based on historical information related to the RAB resource.

Figure 3:
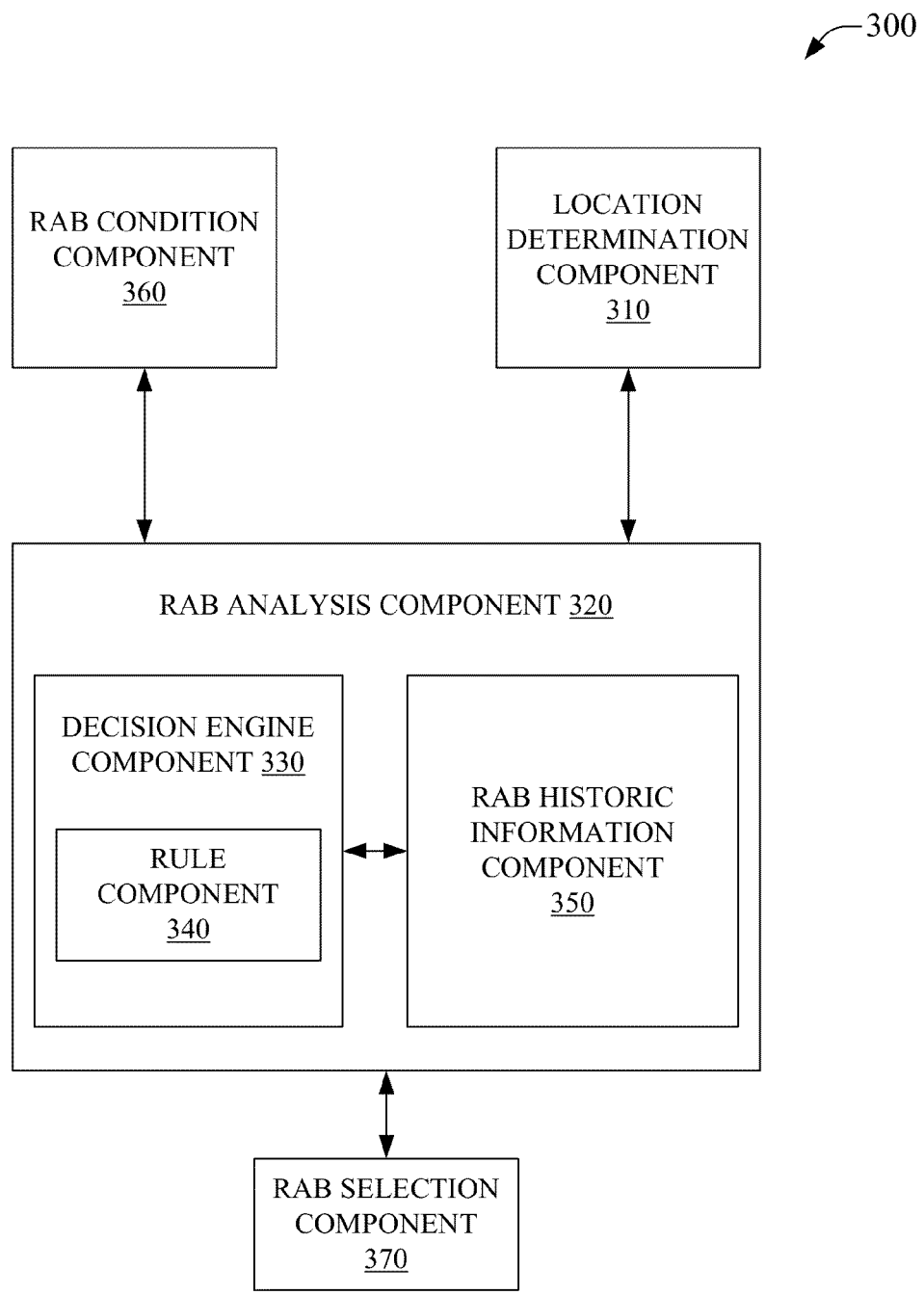
FIG. 3 illustrates a system that facilitates selection of a radio access bearer resource based on historic information related to the radio access bearer resource in accordance with aspects of the subject disclosure.

FIG. 3 illustrates a system 300 that facilitates selection of a radio access bearer resource based on historic information related to the radio access bearer resource in accordance with aspects of the subject disclosure. System 300 can include location determination component 310. Location determination component 310 can facilitate access to location information. Location determination component 310 can be communicatively coupled to RAB analysis component 320. RAB analysis component 320 can facilitate the analysis of one or more RAB resources. In an aspect, a RAB resource can be analyzed based on location information, e.g., location information from location determination component 310. Further, RAB analysis component 320 can analyze contemporaneous information related to a RAB, historical information related to a RAB resource, or combinations thereof.

RAB analysis component 320 can include decision engine component 330 that can facilitate forming determinations relating to RAB resources. Decision engine component 330 can include rule component 340 to facilitate forming determinations related to a RAB resource. Further, decision engine 330 can be communicatively coupled to RAB historic information component 350. RAB historic information component 350 can facilitate receiving historical information related to a RAB resource. RAB historic information component 350 can include local, remote, or distributed data stores including RAB resource data and other historical information related to a RAB resource.

System 300 can further include RAB condition component 360. RAB condition component 360 can facilitate access to contemporaneous information related to a RAB resource. Contemporaneous information related to a RAB resource can include contemporaneous information related to a currently employed RAB resource, e.g., where a RAB resource is being employed by a UE to transmit data, contemporaneous information related to that RAB resource can be received by way of RAB condition component 360. Contemporaneous information related to a RAB resource can also include contemporaneous information related to a RAB resource that can be potentially employed by a UE, e.g., where a RAB resource is available for use by a UE, contemporaneous information related to that RAB resource can be received by way of RAB condition component 360. RAB condition component 360 can function in conjunction with location determination component 310. In an embodiment, location component 310 can determine a UE location, which location information can be received by RAB condition component 360. Based on the location information, RAB condition component 360 can receive the present characteristics of RAB resources in, or near, the determined location. For example, a determination that a UE is located at an office tower, can be received by RAB condition component 360, which, in turn, can access current RAB characteristics for RAB resources at, or near, the office tower. This can facilitate inclusion of contemporaneous aspects of a RAB resource in selection of a RAB resource based on historical information related to the RAB resource as facilitated by RAB analysis component 320.

System 300 can also include RAB selection component 370. RAB selection component 370 can select a RAB based on the analysis of a RAB resource from RAB analysis component 320. As such, in system 300, location information can facilitate determining a RAB resource and both current and past information relating to the RAB resource can be accessed and included in an analysis of the RAB resource. The analysis can, as disclosed herein, relate to indication of a particular RAB resource, to ranking or ordering of RAB resources, or to indication of no acceptable RAB resource. RAB selection component 370 can select a RAB resource based on the analysis, e.g., selecting a particular RAB resource, selection of a ranked RAB resource, or selection of no RAB resource.

Figure 4:
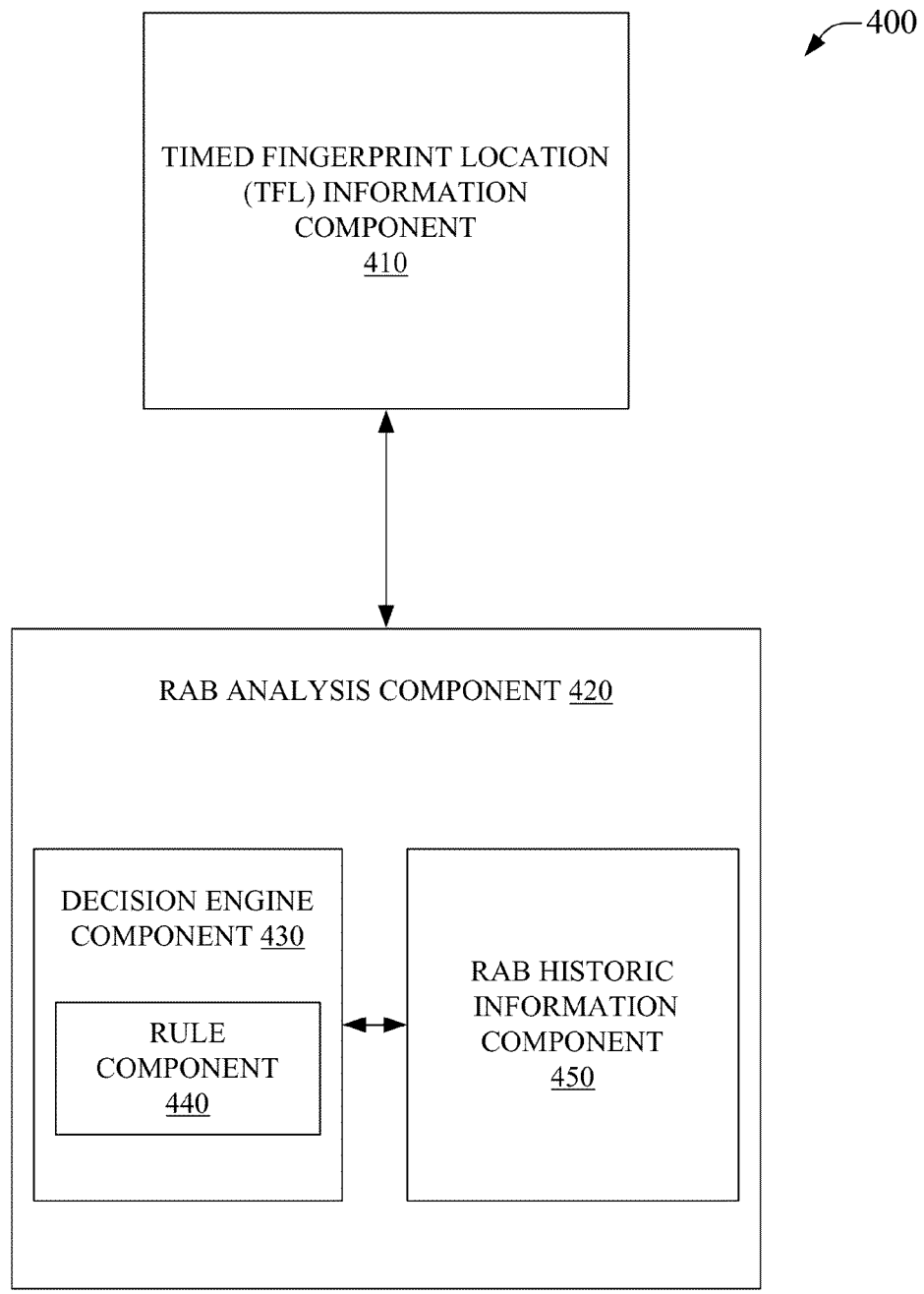
FIG. 4 is a depiction of a system that facilitates selection of a radio access bearer resource based on historic information related to the radio access bearer resource by employing timed fingerprint location information in accordance with aspects of the subject disclosure.

FIG. 4 is a depiction of a system 400 that facilitates selection of a radio access bearer resource based on historic information related to the radio access bearer resource by employing timed fingerprint location information in accordance with aspects of the subject disclosure. System 400 can include TFL location information component 410. TFL location information component 410 can facilitate receiving TFL information. TFL location information component 410 can be communicatively coupled to RAB analysis component 420. RAB analysis component 420 can facilitate the analysis of one or more RAB resources. In an aspect, a RAB resource can be analyzed based on location information, e.g., location information from TFL location information component 410. Further, RAB analysis component 420 can analyze contemporaneous information related to a RAB, historical information related to a RAB resource, or combinations thereof.

RAB analysis component 420 can include decision engine component 430 that can facilitate forming determinations relating to RAB resources. Decision engine component 430 can include rule component 440 to facilitate forming determinations related to a RAB resource. Further, decision engine 430 can be communicatively coupled to RAB historic information component 450. RAB historic information component 50 can facilitate receiving historical information related to a RAB resource. RAB historic information component 450 can include local, remote, or distributed data stores including RAB resource data and other historical information related to a RAB resource.

In an aspect TFL location information component 410 can facilitate access to TFL information. TFL information can be a source of location information for UEs. Moreover, TFL information can be employed at various levels of granularity. Further, TFL information can be employed with little to no additional power consumption. TFL information can provide advantages over GPS-type techniques, near field communication techniques, or proximity sensor techniques and is distinct from these other forms of location determination.

TFL information can include location or timing information as disclosed in more detail in U.S. Ser. No. 12/712,424 filed Feb. 25, 2010, which application is hereby incorporated by reference in its entirety. As such, TFL component 110 can facilitate access to location information for a UE and TFL information can be information from systems in a timed fingerprint location wireless environment, such as a TFL component of a wireless telecommunications carrier. As a non-limiting example, a mobile device, including mobile devices not equipped with a GPS-type system, can be located by looking up timing information associated with the mobile device from a TFL information reference.

In an aspect, TFL information can include information to determine a differential value for a NodeB site pair and a bin grid frame, as disclosed in more detail in incorporated U.S. Ser. No. 12/712,424. A centroid region (possible locations between any site pair) for an observed time value associated with any NodeB site pair (NBSP) can be calculated and is related to the determined value (in units of chip) from any pair of NodeBs. When UE time data is accessed, a value look-up can be initiated (e.g., a lookup for "DV(?,X)" as disclosed in more detail in the application incorporated herein by reference). Relevant NBSPs can be prioritized as part of the lookup. Further, the relevant pairs can be employed as an index to lookup a first primary set. As an example, time data for a UE can be accessed in relation to a locating event in a TFL wireless carrier environment. In this example, it can be determined that a NBSP, with a first reference frame, be used for primary set lookup with the computed DV(?,X) value as the index. This can for example return a set of bin grid frame locations forming a hyperbola between the NodeBs of the NBSP. A second lookup can then be performed for an additional relevant NBSP, with a second reference frame, using the same value DV(?,X), as an index into the data set. Continuing the example, the returned set for the look up with second NBSP can return a second set of bin grid frames. Thus, the UE is likely located in both sets of bin grid frames. Therefore, where the UE is likely in both sets, it is probable that the location for the UE is at an intersection of the two sets. Additional NBSPs can be included to further narrow the possible locations of the UE by providing additional intersections among relevant bin grid sets. As such, employing TFL information for location determination is demonstrably different from conventional location determination techniques or systems such as GPS, eGPS, triangulation or multilateration in wireless carrier environments, near field techniques, or proximity sensors.

As such, TFL location information component 410 can be employed to determine a UE location and such location can be further employed in determining RAB resources. Where the location of a UE is determined, the RAB resources for that area can be accessed based on historical information including the presence of a RAB resource in a location, such as where a cell tower is located near the entrance to a tunnel, when a UE is near the entrance to the tunnel it can be expected that a RAB resource from the cell tower can be available in the region near the tunnel entrance. As such, contemporaneous and historical information relating to the RAB resource near the tunnel entrance can be accessed and analyzed to determine if the RAB resource meets predetermined criteria for selection of the RAB resource in the case of a RAB handover event.

Figure 5:
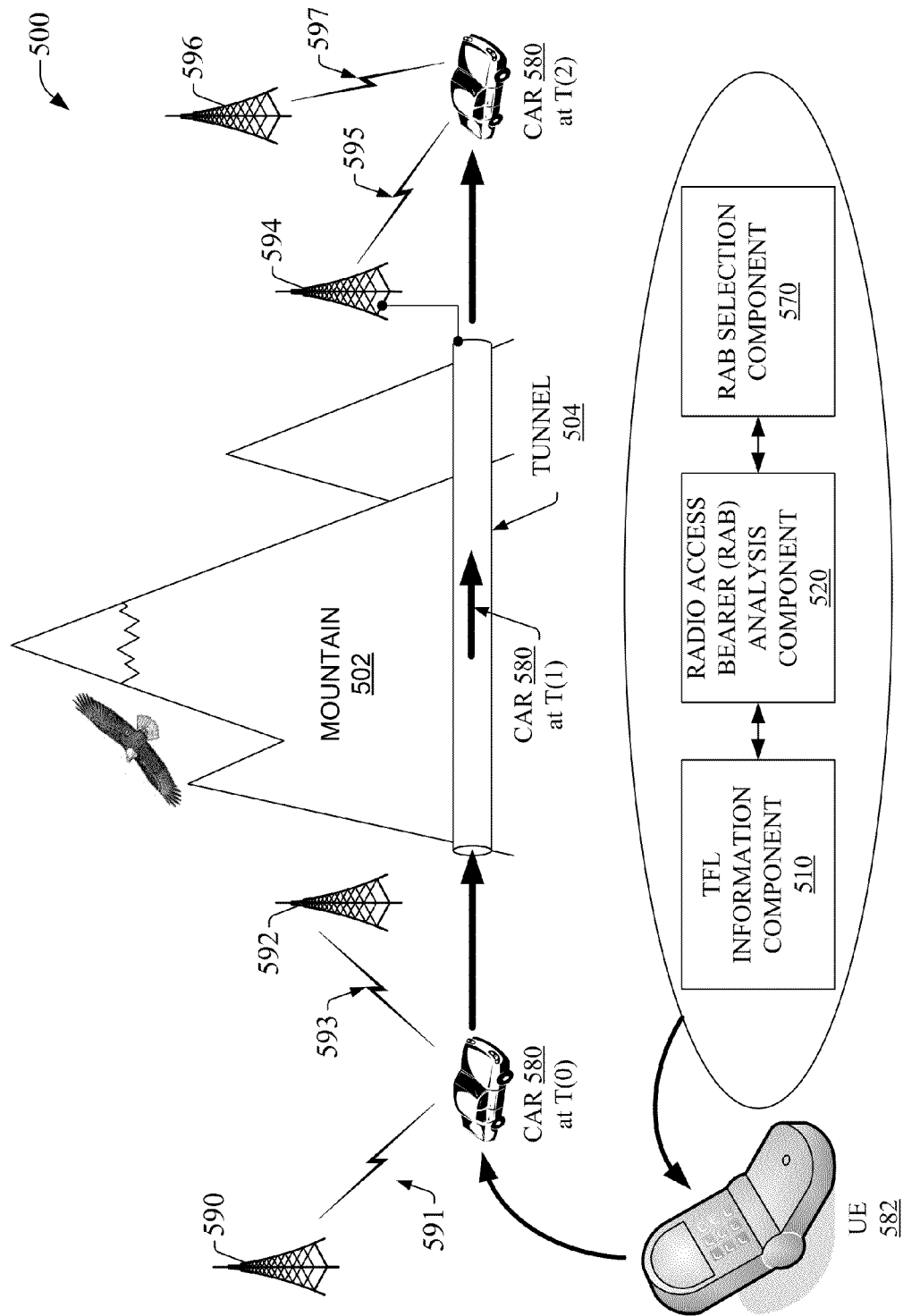
FIG. 5 illustrates a non-limiting exemplary system facilitating selection of a radio access bearer resource based on historic information related to the radio access bearer resource by employing timed fingerprint location information in accordance with aspects of the subject disclosure.

FIG. 5 illustrates a non-limiting exemplary system 500 facilitating selection of a radio access bearer resource based on historic information related to the radio access bearer resource by employing timed fingerprint location information in accordance with aspects of the subject disclosure. System 500 can include UE 582 that can include TFL information component 510, RAB analysis component 520, and RAB selection component 570. TFL information component 510 can facilitate determining the location of UE 582 based on TFL information as disclosed herein. RAB analysis component 520 can facilitate analysis of a RAB resources based on historical information related to the RAB resource as disclosed herein. RAB selection component 570 can facilitate selection of a RAB resource based on the analysis of the RAB resource by RAB analysis component 520, as disclosed herein. UE 582 can be located in car 580. Car 580 can be traveling from T(0) to T(2) by traversing tunnel 504 under mountain 502.

System 500 can further include NodeBs 590, 592, 594 and 596. Each of these NodeBs can facilitate a communications link (e.g., 591, 593, 595, and 597 respectively) with UE 582 traveling in car 580. As such, at T(0), car 580 can be far enough from NodeB 590 that links on RAB 591 are weakening and a handover is increasingly desirable to maintain continuity of data transmission. Also at T(0), a RAB resource is available on RAB 593 from NodeB 592. Further, it can be noted that tunnel 504 is connected to NodeB 594 such that tunnel 504 can provide a RAB resource (not explicitly illustrated) that is the same as that provided on RAB 595. Thus, at T(0), UE 582 in car 580 can undergo a handover from RAB 591 to either/both RAB 593 or RAB 595 by way of tunnel 504.

At T(0), TFL location information can be accessed at 510 to determine the location or UE 582. It can be determined that UE 582 is located near the entrance to tunnel 504 and corresponding RAB 595. This location can also be associated with NodeB 592 and corresponding RAB 593. RAB analysis component 520, based on the location information, can analyze historical information related to RAB 593 and RAB 595 for the given location. In an aspect, it can be noted that at T(1), car 580 and UE 582 are well within tunnel 504 and are unlikely to have connectivity with RAB 593. It can further be noted, that at T(1), UE 582 is likely to have excellent connectivity with RAB 595 specifically because it well within tunnel 504. These aspects of RAB connectivity can be well represented in historical information and data for RAB 593 and RAB 595 at the entrance to tunnel 504. Thus, analysis by RAB analysis component 520 can rank RAB 595 higher than RAB 593 as car 580 and UE 582 approach the tunnel 504 entrance from T(0) to T(1). RAB selection component 570 can select RAB 595 for the handover from RAB 591 for UE 582 inside car 580 at T(0) transitioning to T(1). This can be in contrast to conventional RAB selection technologies that can transition from RAB 591 to RAB 593 then to RAB 595 because they can be ignorant of the historical information related to the RAB resources. In an aspect, eliminating the handover to RAB 593 can reduce the network signaling, reduce loading on NodeB 592, reduce an additional handover event that can be associated with an opportunity to drop the data link, etc. At T(2), car 580 and UE 582 can undergo a handover event from RAB 595 from NodeB 594 to RAB 597 from NodeB 596.

In an aspect, where UE 582 traverses from T(1) to T(0), e.g., the reverse route, analysis at RAB analysis component 520 can indicate that it is preferable to handover from RAB 595 (e.g., the RAB for tunnel 504) to RAB 593 and then to RAB 591 based on the historical information related to the RAB resources for UEs located at T(1) and transitioning to T(0) in contrast to the forward route from T(0) to T(1) as described above.

FIG. 5 is presented only to better illustrate some of the benefits of the presently disclosed subject matter and is explicitly not intended to limit the scope of the disclosure to the various aspects particular to the presently illustrated non-limiting example. In some embodiments, the use of GPS or other location technology can be included as complimentary to TFL information without departing from the scope of the present disclosure. It is noteworthy that GPS or other location information from a UE is not required to determine TFL information as disclosed in the related application. Thus, even where legacy UEs, e.g., UEs without GPS or eGPS capabilities, are in system 500, the timing information from those legacy devices can be employed in TFL location information determinations and similarly in selection of RAB resources based on historical information related to the RAB resources. This can be particularly useful in regions that have limited distribution of GPS enabled UEs or where GPS functions poorly due to environmental factors such as urban cores, mountainous regions, etc.

Figure 6:
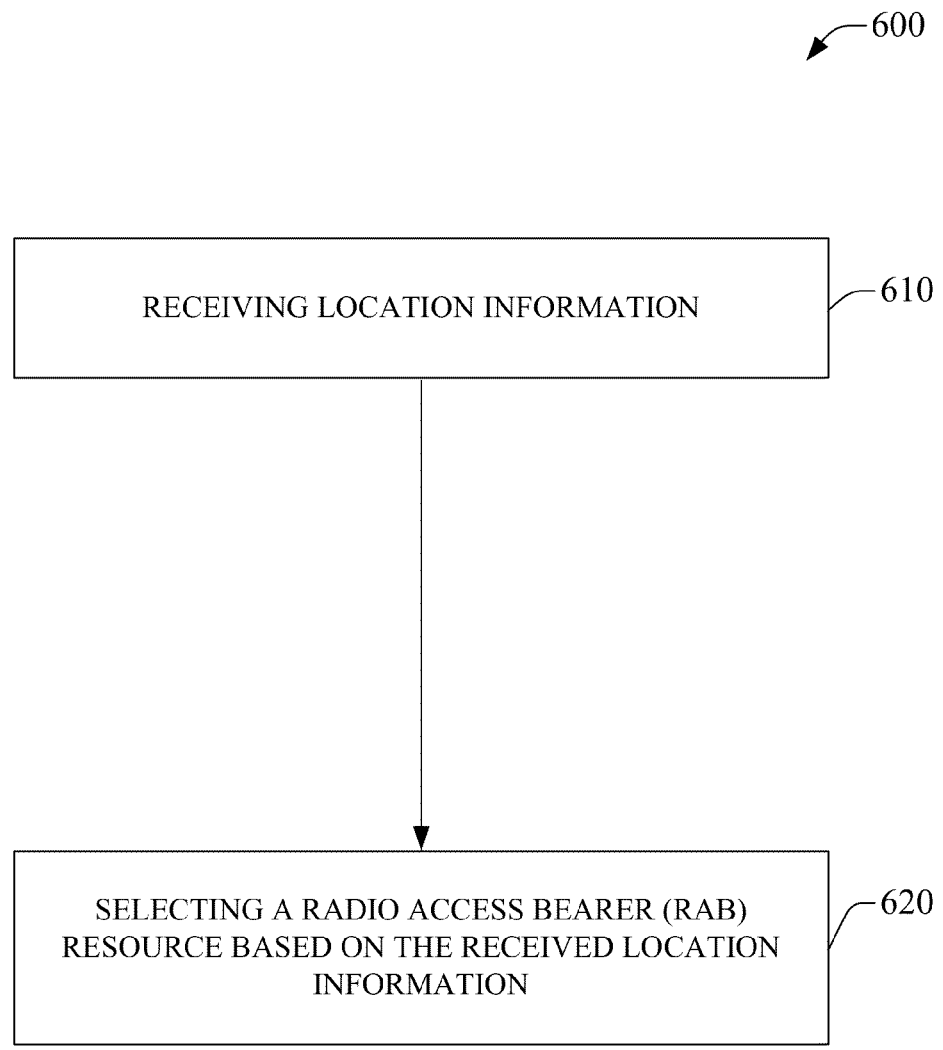
FIG. 6 illustrates a method facilitating selection of a radio access bearer resource based on historic information related to the radio access bearer resource in accordance with aspects of the subject disclosure.
Figure 7:
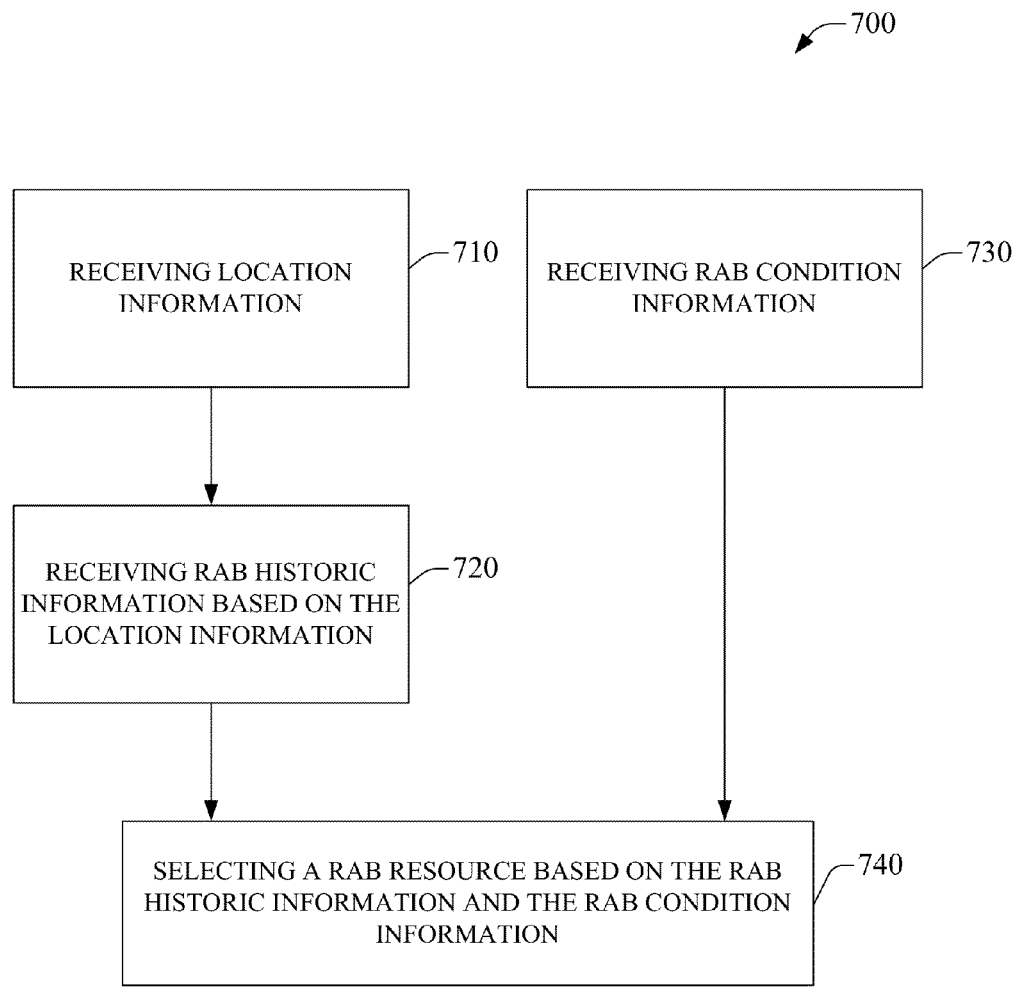
FIG. 7 illustrates a method for facilitating selection of a radio access bearer resource based on historic information related to the radio access bearer resource in accordance with aspects of the subject disclosure.
Figure 8:
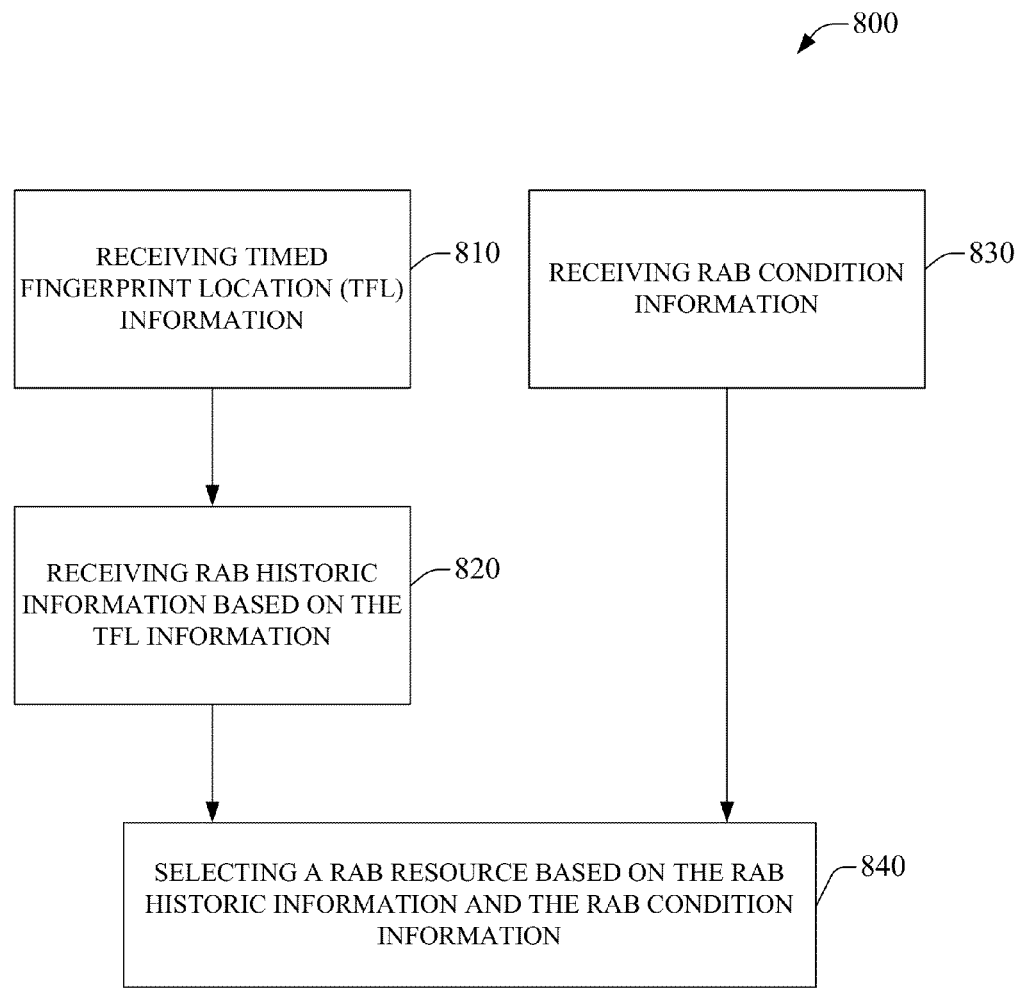
FIG. 8 illustrates a method for facilitating selection of a radio access bearer resource based on historic information related to the radio access bearer resource by employing timed fingerprint location information in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates aspects of a method 600 facilitating selection of a radio access bearer resource based on historic information related to the radio access bearer resource in accordance with aspects of the subject disclosure. At 610, method 600 can receive location information. Location information can be received from nearly any form of location technology, including, GPS, enhanced GPS (eGPS), triangulation, multilateration, proximity sensing, TFL, inertial sensing, etc. For example, location information can be received from a GPS component of a UE. As a second example, location information can be received from a TFL component.

In an aspect, location information for a UE can be employed to facilitate access to historic information related to RAB resources. For example, historic information for a period can be accessed for a region when a UE is determined to be in or near said region. As such, RAB histories for RAB resources in a region around a mobile device can be received. Further, RAB histories for RAB resources in a region in which a mobile device is present can be received. Moreover, RAB histories for RAB resources in a region in which a mobile device is expected to enter can be received.

At 620, method 600 can select a RAB resource based on the location information received in 610. At this point, method 600 can end. Selection of a RAB resource can be based directly on the location of a UE. Further, selection of a RAB resource at 620 can include consideration of historical information relating the RAB resource based on the location information received. For example, location information received at 610 can be employed to determine that historically, a set of RAB resources have been previously detected at the location and thus can be considered as an initial set or RAB resources available for consideration.

Further, the set of RAB resources can be associated with historical characteristics, parameters, and performance metrics that can also be accessed and employed in selecting a RAB resource. For example, a RAB resource with a history of well-sustained handover events can be more highly ranked, e.g., more likely selected, than a RAB resource that has a history of rapidly dropped links. As a second example, a RAB handover event that historically quickly undergoes a subsequent handover event, e.g., which can for example indicate an interim handover, can be less likely to be selected than a RAB handover event that does not quickly undergo a subsequent handover event, e.g., this can indicate that an interim RAB handover is not needed. Of note, the historical set can include RAB resources that are no longer available, but these RAB resources can be quickly removed from the set, e.g., by scanning for the RAB resource where said resource meets conditions for selection of that resource for a handover event.

Moreover, additional RAB resources can be available at a location than are included in the historical set for a variety of reasons, e.g., a RAB resource can be newer than the most recent historical event in the set, etc. These additional RAB resources can also be considered in selecting a RAB resource at 620, although they can lack historical information that can be considered for RAB resources associated with the historical set of RAB resources. As such, the selection of a RAB resource from the additional RAB resources can be based on a more minimal information set, e.g., that may not consider historical information associated with a RAB resource.

In an embodiment, location information can be associated with predetermined rankings of RAB resources based on the historical information associated with the RAB resources in an area at, or near, the location. By preprocessing and ranking the RAB resources, a UE can rapidly select a RAB resource for a handover event, for example, by accessing into a lookup table based on location. Further, access to RAB resource rankings by location can supplement contemporaneous measurements of RAB resources at the UE for selection of a RAB resource. This has the advantage that minimal additional processing is needed to significantly augment the conventional RAB selection process with historical information associated with a RAB resource. Numerous other advantages are not explicitly disclosed for clarity and brevity but are considered within the scope of the present subject matter with regard to incorporation of historical information related to a RAB resource in selecting a RAB resource.

FIG. 7 illustrates a method 700 that facilitates selection of a radio access bearer resource based on historic information related to the radio access bearer resource in accordance with aspects of the subject disclosure. At 710, method 700 can receive location information. At 720, location information from 710 can be employed to facilitate access to historic information related to RAB resources.

At 730, RAB resource condition information can be received. RAB condition information can include contemporaneous information for RAB resources associated with the location information, e.g., from 710. Further, RAB condition information can include contemporaneous information for RAB resources not associated with a particular location, e.g., a RAB resource can be newer than a set of RAB resources returned for a lookup for a particular location, etc. This contemporaneous information for RAB resources can be include RAB characteristics, such as, bandwidth, QoS, uplink and downlink power, frequency, etc., and can reflect the current conditions for potential RAB links on those RAB resources.

At 740, method 700 can select a RAB resource based on the historical information related to a RAB resource form 720 and contemporaneous RAB resource conditions from 730. At this point, method 700 can end. Selection of a RAB resource can include consideration of historical information relating the RAB resource received at 720. For example, historically a set of RAB resources can be associated with a particular location. As a second example, historically a RAB resource can be associated with particularly desirable or undesirable performance for prior handover events, which can serve as a predictor of future RAB resource performance. These historical characteristics, parameters, and performance metrics can be accessed and employed in selecting a RAB resource at 740. Access and employment of historical data from 720 can be considered in light of contemporaneous RAB condition information received at 730. For example, a RAB resource with a history of well-sustained handover events can be selected over a RAB resource that has a higher contemporaneous bandwidth. As a second example, a RAB resource with a high contemporaneous QoS can be selected from two RAB resources both having histories of well-sustained handover events.

As previously noted, a historical set can include RAB resources that are no longer available, but these RAB resources can be quickly removed from the set. Also as previously noted, additional RAB resources can be available at a location. These additional RAB resources can also be considered in selecting a RAB resource at 740, although they can lack historical information. Further, in some embodiments, location information can be associated with predetermined rankings of RAB resources based on the historical information associated with the RAB resources in a region at, or near, a location, which can significantly augment the conventional RAB selection process with historical information associated with a RAB resource.

FIG. 8 illustrates a method 800 that facilitates selection of a radio access bearer resource based on historic information related to the radio access bearer resource by employing timed fingerprint location information in accordance with aspects of the subject disclosure. At 810, method 800 can receive timed fingerprint location (TFL) information. TFL information can include location information as disclosed in more detail in U.S. Ser. No. 12/712,424 filed Feb. 25, 2010, which application, as previously stated, is hereby incorporated by reference in its entirety. As such, TFL information can include location information for a UE based on timing information. As a non-limiting example, a mobile device, including mobile devices not equipped with a GPS-type system, can be located by looking up timing information associated with the mobile device from a TFL information reference. As such, the exemplary mobile device can be located using TFL information without employing GPS-type techniques. In an aspect, TFL information can include information to determine a DV(?,X). The centroid region (possible locations between any site pair) for an observed time value associated with any NodeB site pair (NBSP) can be calculated and is related to the determined value (in units of chip) from any pair of NodeBs. When UE time data is accessed, a DV(?, X) look-up can be initiated. Relevant NBSPs can be prioritized as part of the look-up. Further, the relevant pairs can be employed as an index to lookup a first primary set. As an example, time data for a UE can be accessed in relation to a locating event in a TFL wireless carrier environment. In this example, it can be determined that a NBSP, with a first reference frame, be used for primary set lookup with the computed DV(?,X) value as the index. This can for example return a set of bin grid frames locations forming a hyperbola between the NodeBs of the NBSP. A second lookup can then be performed for an additional relevant NBSP, with a second reference frame, using the same value DV(?,X), as an index into the data set. Continuing the example, the returned set for the look up with second NBSP can return a second set of bin grid frames. Thus, the UE is likely located in both sets of bin grid frames. Therefore, where the UE is most likely in both sets, it is probable that the location for the UE is at the intersection of the two sets. Additional NBSPs can be included to further narrow the possible locations of the UE. Employing TFL information for location determination is demonstrably different from conventional location determination techniques or systems such as GPS, eGPS, triangulation or multilateration in wireless carrier environments, near field techniques, or proximity sensors.

At 820, TFL information from 810 can be employed to facilitate access to historic information related to RAB resources. For example, TFL information received at 810 can be employed to determine that historically, a set of RAB resources have been previously detected at the location and thus can be considered as an initial set of RAB resources. The set of RAB resources can also be associated with historical characteristics, parameters, and performance metrics that can also be accessed and employed in selecting a RAB resource. For example, a RAB resource with a history of poorly sustained handover events can be removed from a set of selectable RAB resources. Of note, the historical set can include RAB resources that are no longer available, but these RAB resources can be quickly removed from the set.

At 830, RAB resource condition information can be received. RAB condition information can include contemporaneous information for RAB resources associated with the TFL information, e.g., from 810. Further, RAB condition information can include contemporaneous information for RAB resources not associated with a particular location, e.g., a RAB resource can be newer than a set of RAB resources returned for a lookup for a particular location, etc. This contemporaneous information for RAB resources can be include RAB characteristics, such as, bandwidth, QoS, uplink and downlink power, frequency, etc., and can reflect the current conditions for potential RAB links on those RAB resources. At 840, method 800 can select a RAB resource based on the historical information related to a RAB resource form 820 and contemporaneous RAB resource conditions from 830. At this point, method 800 can end.

As previously noted, a historical set can include RAB resources that are no longer available, but these RAB resources can be quickly removed from the set. Also as previously noted, additional RAB resources can be available at a location. These additional RAB resources can also be considered in selecting a RAB resource at 840, although they can lack historical information. Further, in some embodiments, location information can be associated with predetermined rankings of RAB resources based on the historical information associated with the RAB resources in a region at, or near, a location, which can significantly augment the conventional RAB selection process with historical information associated with a RAB resource.

Figure 9:
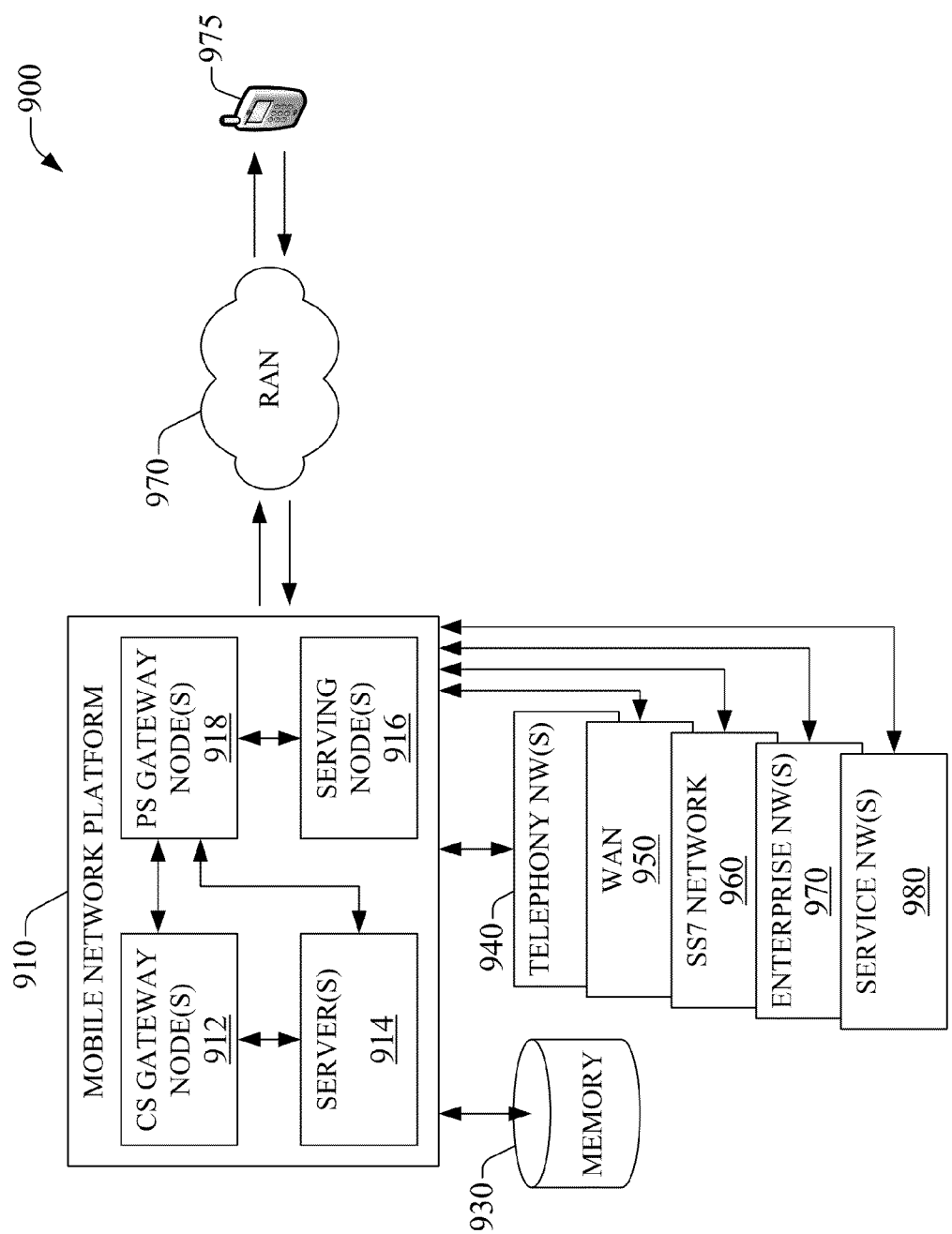
FIG. 9 is a block diagram of an exemplary embodiment of a mobile network platform to implement and exploit various features or aspects of the subject disclosure.

FIG. 9 presents an example embodiment 900 of a mobile network platform 910 that can implement and exploit one or more aspects of the subject innovation described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included as part of a telecommunications carrier network, including telecommunications carrier networks employing timed fingerprint location environments. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 970; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows, including selection of RAB resources for communicating data, wherein selection includes the consideration of historical information relating to the RAB resources. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970. In an aspect, memory 930 can be, for example, accessed as part of a data store component or as a remotely connected memory store.

Figure 10:
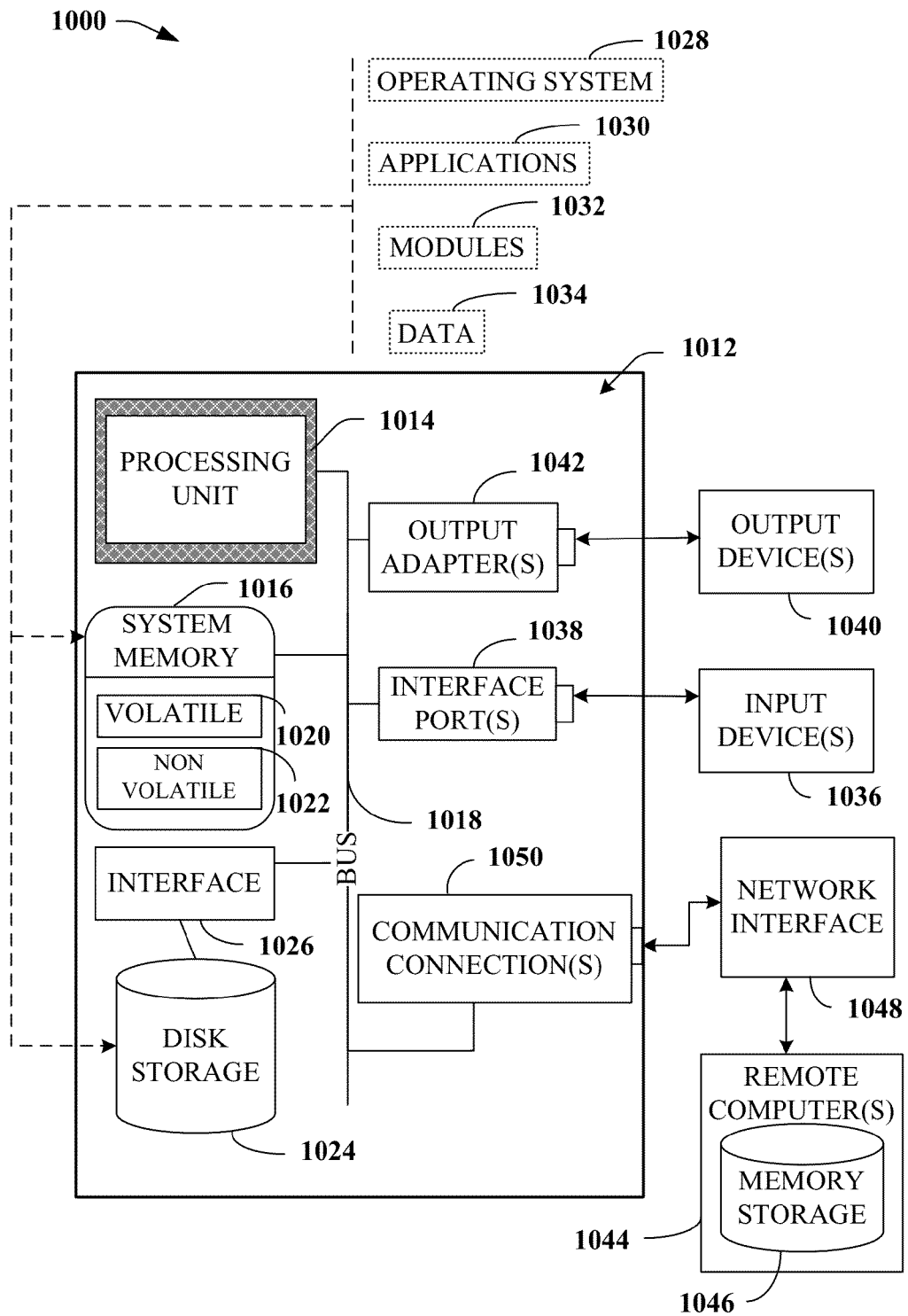
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory, for example, can be included in volatile memory 1020, non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of a RAB selection component or timed fingerprint location component, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1016 includes volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026. For example, disk storage 1024 can store one or more TFL lookup tables facilitating lookup of location information based on NodeB site pairs and time values, historical information associated with a RAB resource, contemporaneous RAB resource parameters, RAB resource selection rules or algorithms, etc.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028 (e.g., OS component(s) 312, etc.) Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1011 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the term "core-network", "core", "core carrier network", or similar terms can refer to components of a telecommunications network that typically providing some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femtocell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a memory to store executable instructions; and
   a processor, coupled to the memory, that facilitates execution of the executable instructions to perform operations, comprising:
      determining that a wireless connectivity coverage area, associated with a first radio access bearer resource of a set of radio access bearer resources without a communicative coupling to a user equipment, comprises a location represented by location information associated with the user equipment;
      determining a predicted wireless connectivity performance indicator related to the user equipment;
      determining that a first condition relating to past wireless connectivity performance information associated with the first radio access bearer resource and further relating to the predicted wireless connectivity performance indicator is satisfied;
      based on the first condition being determined to have been satisfied, associating a value, based on the past wireless connectivity performance information, with the first radio access bearer resource;
      based on the value, determining a rank ordering of the radio access bearer resource relative to other radio access bearer resources of the set of radio access bearer resources; and
      based on the rank ordering, initiating a communications link to the user equipment via a second radio access bearer resource selected from the set of radio access bearer resources.

2. The system of claim 1, wherein the operations further comprise determining additional location information, the additional location information comprising direction information and speed information.

3. The system of claim 2, wherein the additional location information is determined from first location information associated with the user equipment correlated with a first time and second location information associated with the user equipment correlated with a second time.

4. The system of claim 2, wherein the operations further comprise predicting a future location of the user equipment based on the additional location information.

5. The system of claim 4, wherein the operations further comprise determining that the wireless connectivity coverage area associated with the first radio access bearer resource comprises the future location of the user equipment.

6. The system of claim 1, wherein the operations further comprise determining the location based on timed fingerprint location information.

7. The system of claim 1, wherein the determining that the first condition is satisfied is based on wireless network transfer sustainability information represented by the past wireless connectivity performance information.

8. The system of claim 1, wherein the operations further comprise receiving a rule associated with the determining that the first condition is satisfied.

9. The system of claim 1, wherein the operations further comprise receiving the past wireless connectivity performance information associated with the first radio access bearer resource.

10. The system of claim 9, wherein the past wireless connectivity performance information comprises network transfer sustainability information for the first radio access bearer resource, and wherein the network transfer sustainability information comprises information associated with a lifespan of a successful network transfer of the first radio access bearer resource.

11. The system of claim 9, wherein the past wireless connectivity performance information comprises past interim network transfer information for the first radio access bearer resource, wherein the past interim network transfer information comprises information associated with a first successful network transfer of the first radio access bearer resource followed by a second successful network transfer of the first radio access bearer resource, and wherein the first successful network transfer has a shorter lifespan than the second successful network transfer.

12. The system of claim 1, wherein the operations further comprise
receiving updated wireless connectivity performance information associated with the first radio access bearer resource; and
determining that a second condition relating to the updated wireless connectivity performance information is satisfied,
wherein the associating the value with the first radio access bearer resource is further based on the second condition being determined to have been satisfied.

13. The system of claim 1, wherein the value is a rank value for the first radio access bearer resource to facilitate ranking the set of radio access bearer resources.

14. A method, comprising:
receiving, by a system comprising a processor, location information associated with a user equipment;
determining, by the system, that a radio access bearer resource of a set of radio access bearer resources provides coverage to the location, wherein the set of radio access bearer resources excludes radio access bearer resources communicatively coupled to the user equipment;
determining, by the system, a value related to rank ordering the radio access bearer resource relative to other radio access bearer resources of the set of radio access bearer resources based on historical connectivity performance information of the set of radio access bearer resources;
selecting, by the system, the radio access bearer resource based on the value being determined to have satisfied a rule related to selection of the radio access bearer resource; and
initiating, by the system, a communications link with the user equipment via the radio access bearer resource.

15. The method of claim 14, further comprising receiving, by the system and based on the location information, the historical wireless connectivity performance information associated with the radio access bearer resource.

16. The method of claim 14, further comprising receiving, by the system, contemporaneous wireless connectivity performance information associated with the user equipment, and wherein the selecting the radio access bearer resource is further based on the contemporaneous wireless connectivity performance information.

17. The method of claim 14, wherein the receiving the location information comprises receiving timed fingerprint location information.

18. A mobile device, comprising:
a memory to store executable instructions; and
a processor, coupled to the memory, that facilitates execution of the executable instructions to perform operations, comprising:
determining location information associated with the mobile device;
determining that a radio access bearer resource of a set of radio access bearer resources, which excludes radio access bearer resources having a communicative coupling to the mobile device, provides coverage to the mobile device based on the location information;
receiving historical wireless handover performance information related to the radio access bearer resource;
designating a value associated with the radio access bearer resource based on the historical wireless handover performance information, wherein the value is related to sorting the set of radio access bearer resources by historical wireless network transfer performance; and
selecting the radio access bearer resource from the set of radio access bearer resources based on the value satisfying a condition related to a rank of the radio access bearer resource.

19. The mobile device of claim 18, wherein the determining the location information is based on timed fingerprint location information.

20. The mobile device of claim 18, wherein the selecting the radio access bearer resource is further based on a predicted location of the user equipment.

* * * * *